(12) United States Patent
Gotou

(10) Patent No.: US 9,475,311 B2
(45) Date of Patent: Oct. 25, 2016

(54) IMAGE FORMING METHOD AND IMAGE FORMING APPARATUS

(71) Applicant: Hiroshi Gotou, Shizuoka (JP)

(72) Inventor: Hiroshi Gotou, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 14/506,770

(22) Filed: Oct. 6, 2014

(65) Prior Publication Data

US 2015/0103116 A1    Apr. 16, 2015

(30) Foreign Application Priority Data

Oct. 10, 2013 (JP) ................ 2013-212492

(51) Int. Cl.
*B41J 2/21*     (2006.01)
*B41J 11/00*    (2006.01)
(Continued)

(52) U.S. Cl.
CPC ........... *B41J 11/002* (2013.01); *B41J 2/2107* (2013.01); *B41J 2/2114* (2013.01);
(Continued)

(58) Field of Classification Search
CPC ........ B41J 2/01; B41J 2/0057; B41J 2/1433; B41J 2/17; B41J 2/1755; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/328; C09D 11/36; C09D 11/38; C09D 11/40; C09D 11/52; C09D 11/54; C09D 11/101
USPC ............... 347/9–22, 88, 95–105; 106/31.13, 106/31.27, 31.6, 31.85, 31.77; 523/160, 523/161
See application file for complete search history.

(56) References Cited

U.S. PATENT DOCUMENTS 8,109,622 B2    2/2012    Goto et al.
8,242,201 B2    8/2012    Goto et al.
(Continued)

FOREIGN PATENT DOCUMENTS

JP    03-169644    7/1991
JP    2004-330568    11/2004
(Continued)

OTHER PUBLICATIONS

U.S. Appl. No. 14/158,969, filed Jan. 20, 2014.
(Continued)

*Primary Examiner* — Manish S Shah
(74) *Attorney, Agent, or Firm* — Oblon, McClelland, Maier & Neustadt, L.L.P.

(57) ABSTRACT

An image forming method, which includes: ejecting an inkjet ink containing a colorant, a water-soluble organic solvent, a surfactant, and water onto a surface of a recording medium at a side where a coating layer is provided, to thereby form an image, in which the recording medium contains a support, and the coating layer provided at least one surface of the support; and heating the image to a temperature of 100° C. to 150° C. during, or after, or both during and after formation of the image in the ejecting, to thereby heat-fix the image onto the recording medium, wherein the water-soluble organic solvent contains at least a compound represented by the following structural formula (I):

<Structural Formula (I)>

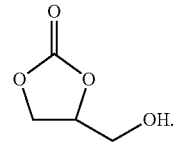

10 Claims, 3 Drawing Sheets

(51) Int. Cl.
  *B41M 5/00* (2006.01)
  *B41M 7/00* (2006.01)
  *C09D 11/10* (2014.01)
  *C09D 11/322* (2014.01)
  *C09D 11/38* (2014.01)
  *C09D 11/54* (2014.01)

(52) U.S. Cl.
  CPC .......... *B41M 5/0011* (2013.01); *B41M 7/009* (2013.01); *C09D 11/10* (2013.01); *C09D 11/322* (2013.01); *C09D 11/38* (2013.01); *C09D 11/54* (2013.01); *B41M 5/0023* (2013.01)

(56) References Cited

U.S. PATENT DOCUMENTS

| | | | |
|---|---|---|---|
| 8,382,271 | B2 | 2/2013 | Goto et al. |
| 2008/0146693 | A1* | 6/2008 | Herlihy ............... C09D 11/101 522/146 |
| 2008/0233363 | A1 | 9/2008 | Goto |
| 2009/0291213 | A1 | 11/2009 | Ohshima et al. |
| 2010/0196601 | A1 | 8/2010 | Goto et al. |
| 2010/0239759 | A1* | 9/2010 | Tojo ................... C09D 11/322 427/256 |
| 2010/0295891 | A1 | 11/2010 | Goto et al. |
| 2011/0318543 | A1 | 12/2011 | Goto |
| 2012/0128949 | A1* | 5/2012 | Goto ................... B41M 5/0017 428/207 |
| 2012/0207983 | A1 | 8/2012 | Matsuyama et al. |
| 2012/0249705 | A1* | 10/2012 | Aoki ................... C09D 11/322 347/102 |
| 2012/0293582 | A1 | 11/2012 | Goto et al. |
| 2012/0320137 | A1 | 12/2012 | Fujii et al. |
| 2013/0002776 | A1 | 1/2013 | Nagashima et al. |
| 2013/0065028 | A1 | 3/2013 | Fujii et al. |
| 2013/0070017 | A1 | 3/2013 | Fujii et al. |
| 2013/0071637 | A1 | 3/2013 | Matsuyama et al. |
| 2013/0101814 | A1 | 4/2013 | Gotou et al. |
| 2013/0113860 | A1 | 5/2013 | Gotou et al. |
| 2013/0143008 | A1 | 6/2013 | Gotou et al. |
| 2013/0155145 | A1 | 6/2013 | Gotou et al. |
| 2013/0169724 | A1 | 7/2013 | Gotou |
| 2013/0176369 | A1 | 7/2013 | Gotou et al. |
| 2013/0194343 | A1 | 8/2013 | Yokohama et al. |
| 2013/0194344 | A1 | 8/2013 | Yokohama et al. |
| 2013/0194345 | A1 | 8/2013 | Tamai et al. |
| 2013/0321525 | A1 | 12/2013 | Fujii et al. |
| 2013/0323474 | A1 | 12/2013 | Gotou et al. |
| 2014/0002539 | A1 | 1/2014 | Goto et al. |
| 2014/0069295 | A1 | 3/2014 | Fujii et al. |
| 2014/0240391 | A1 | 8/2014 | Goto et al. |

FOREIGN PATENT DOCUMENTS

| | | |
|---|---|---|
| JP | 2007-144975 | 6/2007 |
| JP | 2011-162612 | 8/2011 |
| JP | 2011162612 A * | 8/2011 |

OTHER PUBLICATIONS

U.S. Appl. No. 14/154,595, filed Jan. 14, 2014.
U.S. Appl. No. 14/327,817, filed Jul. 10, 2014.

* cited by examiner

IMAGE FORMING METHOD AND IMAGE FORMING APPARATUS

BACKGROUND OF THE INVENTION

1. Field of the Invention

The present invention relates to an image forming method and an image forming apparatus.

2. Description of the Related Art

Use of an inkjet recording method has been recently rapidly increased, as a color image is easily recorded, and running cost is low.

As for an inkjet ink, an aqueous pigment ink, in which a pigment is turned into fine particles and dispersed in water, has attracted attentions. As a pigment has a similar composition to that of a colorant used in a commercial printing ink, the aqueous pigment ink has been expected to produce a print close to that of commercial printing.

Accordingly, there is a need for an ideal image forming method, which can perform a full-color printing on a commercial printing sheet with excellent quality at high speed, and gives excellent drying properties and abrasion resistance of a recorded product.

SUMMARY OF THE INVENTION

The present invention aims to provide an ideal image forming method, which enables a full-color recording on a commercial printing sheet with high quality and at high speed, and gives excellent drying properties and abrasion resistance of a recorded product.

As the means for solving the aforementioned problems, the image forming method of the present invention contains:

ejecting an inkjet ink containing a colorant, a water-soluble organic solvent, a surfactant, and water onto a surface of a recording medium at a side where a coating layer is provided, to thereby form an image, in which the recording medium contains a support, and the coating layer provided at least one surface of the support; and heating the image to a temperature of 100° C. to 150° C. during, or after, or both during and after formation of the image in the ejecting, to thereby heat-fix the image onto the recording medium, wherein the water-soluble organic solvent contains at least a compound represented by the following structural formula (I):

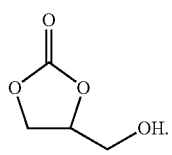

<Structural Formula (I)>

The present invention can solve the aforementioned various problems in the art, achieve the aforementioned object, and provide an ideal image forming method, which enables a full-color recording on a commercial printing sheet with high quality and at high speed, and gives excellent drying properties and abrasion resistance of a recorded product.

DETAILED DESCRIPTION OF THE INVENTION

Figure 1:
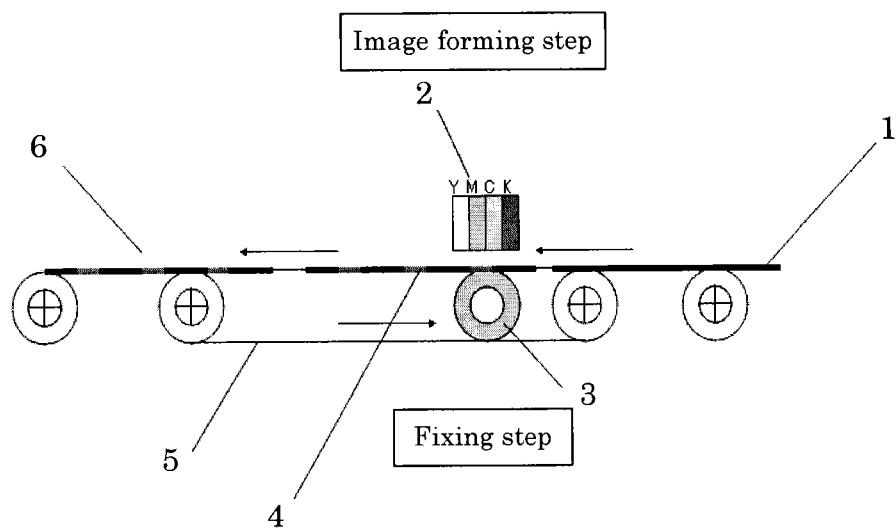
FIG. 1 is a schematic diagram illustrating one example of an entire structure of the image forming method of the present invention, and illustrates an embodiment where heat-fixing is performed during image formation.

Image Forming Method and Image Forming Apparatus

The image forming method of the present invention contains an image forming step, and a fixing step, preferably further contains a post-treatment step, and may further contain other steps according to the necessity.

The image forming apparatus of the present invention contains an image forming unit, and a fixing unit, preferably further contains a post-treatment unit, and may further contain other units according to the necessity.

The image forming method is an ideal method, as it enables full-color recording on a commercial printing sheet with excellent quality at high speed, and gives excellent drying properties and abrasion resistance of a recorded product, and moreover, the image forming method aims to overcome the following phenomena.

(1) A phenomenon that beading of a solid image (a phenomenon that adjacent dots are pulled to each other to give grain-like appearance in a resulting image) or color bleeding between different colors is caused on coated paper, which contains a coating layer and has poor ink absorbance, such as a printing sheet.

(2) A phenomenon that image glossiness is reduced when beading of a solid image, or color bleeding between different colors is significantly improved.

In the present invention, a water-soluble organic solvent in the inkjet ink for use in image formation contains the compound represented by the following structural formula (I). The compound represented by the structural formula (I) is thermally decomposed, as the image is heated to the range of 100° C. to 150° C. during and/or after image formation. Since carbonic acid gas ($CO_2$) generated by the thermal decomposition causes aggregations and/or increased viscosity of an anionic compound (pigment dispersion elements or a water-dispersible resin) contained in the ink, beading and color bleeding are prevented.

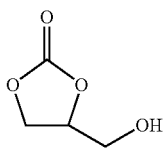
<Structural Formula (I)>

The gloss is provided to an image formation area to a certain degree by adding a water-dispersible compound covering a pigment, and a water-dispersible compound, which is added later, in an inkjet ink. However, image gloss and abrasion resistance (fixing ability without smearing) are improved even further by providing a resin layer on the image formation area through a post-treatment.

[Image Forming Step and Image Forming Unit]

The image forming step is a step containing ejecting an inkjet ink containing a colorant, a water-soluble organic solvent, a surfactant, and water onto at least onto a surface of a recording medium at which a coating layer is provided, where the recording medium contains a support, and the coating layer provided at least one surface of the support, to thereby form an image. The image forming step is performed by the image forming unit.

<Inkjet Ink>

The inkjet ink (may be also referred to as an "ink" hereinafter) for use in the present invention contains a colorant, a water-soluble organic solvent, a surfactant, and water, preferably further contains a water-dispersible resin, and may further contain other components according to the necessity.

<<Water-Soluble Organic Solvent>>

As for the water-soluble organic solvent, used are the compound represented by the following structural formula (I), and the following solvent typically used as a wetting agent. The thermal decomposition of the compound represented by the structural formula (I) is caused by adding the compound represented by the structural formula (I) to an ink, and heating the ink to the range of 100° C. to 150° C. during or just after image formation. An anionic compound (pigment dispersion elements or a water-dispersible resin) contained in the ink is aggregated or viscosity thereof is increased by the carbonic acid gas ($CO_2$) generated by the thermal decomposition, therefore beading and color bleeding are prevented.

An amount of the compound represented by the structural formula (I) is preferably 1% by mass to 40% by mass, more preferably 2% by mass to 30% by mass, relative to a total amount of the ink. When the amount thereof is less than 1% by mass, an effect of aggregating the anionic compound or increasing viscosity of an ink is small, even through the compound is thermally decomposed, and therefore an effect of preventing beading and color bleeding may be small. When the amount thereof is greater than 40% by mass, ejection stability of a resulting ink may be poor, as the compound represented by the structural formula (I) is a compound having low moisture retention ability.

As for an organic solvent used together with the compound represented with the structural formula (I), the following solvent can be used.

The polyhydric alcohol having the equilibrium moisture content of 30% by mass or greater in the environment having the temperature of 23° C., and the relative humidity of 80% can be contained as a wetting agent. Among them, the one having a high equilibrium moisture content and a high boiling point is preferable.

Specific examples thereof include diethylene glycol (bp: 245° C., 43% by mass), triethylene glycol (bp: 285° C., 39% by mass), tetraethylene glycol (bp: 324° C. to 330° C., 37% by mass), 1,3-butanediol (bp: 203° C. to 204° C., 35% by mass), glycerin (bp: 290° C., 49% by mass), diglycerin (bp: 270° C./20 hPa, 38% by mass), 1,2,3-butanetriol (bp: 175° C./33 hPa, 38% by mass), and 1,2,4-butanetriol (bp: 190° C./24 hPa to 191° C./24 hPa, 41% by mass). These may be used alone, or in combination. Among them, preferred are glycerin, and 1,3-butanediol.

An amount of the polyhydric alcohol is preferably 2% by mass to 50% by mass, more preferably 5% by mass to 40% by mass, relative to a total amount of the ink. When the amount thereof is less than 2% by mass, a moisture retention effect of the ink may not be exhibited. When the amount thereof is greater than 50% by mass, drying properties of the ink may be poor on a surface of paper, and moreover, quality of characters printed on plain paper may be low.

Use of the polyhydric alcohol in an amount of 50% by mass or greater relative to a total amount of the water-soluble organic solvents is preferable, as the polyhydric alcohol contributes to secure ejection stability and prevention of adherence of a waste ink in a maintaining device of an ink ejection device.

The equilibrium moisture content (%) is determined by storing a laboratory dish, in which 1 g of each water-soluble organic solvent is weighed, in a desiccator the temperature and relative humidity of which has been maintained at 23° C.±1° C., and 80%±3%, respectively, using a potassium chloride/sodium chloride saturated aqueous solution to measure a moisture content equilibrated, and calculating from the following equation:

Equilibrium moisture content (%)=[Mass of moisture absorbed by the organic solvent/(Mass of the organic solvent+Mass of moisture absorbed by the organic solvent)]×100

Moreover, examples of a water-soluble organic solvent used secondarily to the wetting agent include alkyl alkane diol. As long as the water-soluble organic solvent is the alkyl alkane diol, in which a principle chain is C3-C6 alkane diol, and a branched chain is C1-C2 alkyl group, a desirable balance of hydrophilic groups and hydrophobic groups is achieved, and it is water-soluble and is rich in hydrophobic groups, and therefore a resulting ink is easily penetrated into a recording medium.

Among them, preferred are 2-methyl-1,3-butanediol (bp: 214° C.), 3-methyl-1,3-butanediol (bp: 203° C.), 3-methyl-1,5-pentanediol (bp: 250° C.), and 2-ethyl-1,3-hexanediol (bp: 243.2° C.).

An amount of the alkyl alkane diol is preferably 2% by mass to 40% by mass, more preferably 5% by mass to 30% by mass, relative to a total amount of the ink. When the amount thereof is less than 2% by mass, an effect of penetrating an ink into a recording medium is not exhibited, an effect of improving an image quality is not attained, and moreover, an effect of improving drying properties of an ink on a general printing sheet is not attained. When the amount thereof is greater than 40% by mass, a viscosity of a resulting ink increases, and therefore ejection stability of the ink may become poor.

The ink may contain a water-soluble organic solvent other than the aforementioned water-soluble organic solvent, or a wetting agent in combination.

Examples thereof include polyhydric alcohol, polyhydric alcohol alkyl ether, polyhydric aryl ether, a nitrogen-containing heterocyclic compound, amide, amine, a sulfur-containing compound, propylene carbonate, ethylene carbonate, and other wetting agents.

Examples of the polyhydric alcohol include dipropylene glycol (bp: 232° C.), 1,5-pentanediol (bp: 242° C.), propylene glycol (bp: 187° C.), 2-methyl-2,4-pentanediol (bp: 197° C.), ethylene glycol (bp: 196 to 198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C. to 260° C.), 1,2,6-hexanetriol (bp: 178° C.), trimethylol ethane (solid, mp: 199° C. to 201° C.), and trimethylol propane (solid, mp: 61° C.).

Examples of the polyhydric alcohol alkyl ether include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycol mono-2-ethylhexyl ether (bp: 229° C.), and propylene glycol monoethyl ether (bp: 132° C.).

Examples of the polyhydric alcohol aryl ether include ethylene glycol monophenyl ether (bp: 237° C.), and ethylene glycol monobenzyl ether.

Examples of the nitrogen-containing heterocyclic compound include 2-pyrrolidone (bp: 250° C., mp: 25.5° C., 47% by mass to 48% by mass), N-methyl-2-pyrrolidone (bp: 202° C.), 1,3-dimethyl-2-imidazolidinone (bp: 226° C.), ε-caprolactam (bp: 270° C.), and γ-butyrolactone (bp: 204° C. to 205° C.).

Examples of the amide include formamide (bp: 210° C.), N-methylformamide (bp: 199° C. to 201° C.), N,N-dimethylformamide (bp: 153° C.), and N,N-diethylformamide (bp: 176° C. to 177° C.).

Examples of the amine include monoethanol amine (bp: 170° C.), diethanol amine (bp: 268° C.), triethanol amine (bp: 360° C.), N,N-dimethyl monoethanol amine (bp: 139° C.), N-methyl diethanol amine (bp: 243° C.), N-methylethanol amine (bp: 159° C.), N-phenylethanol amine (bp: 282° C. to 287° C.), and 3-aminopropyl diethyl amine (bp: 169° C.).

Examples of the sulfur-containing compound include dimethyl sulfoxide (bp: 139° C.), sulfolane (bp: 285° C.), and thiodiglycol (bp: 282° C.).

As for other solid wetting agents, saccharides are preferable. Examples of the saccharides include monosaccharides, dissacharides, oligosaccharides (including trisaccharides, and tetrasaccharides), and polysaccharide.

Specific examples thereof include glucose, mannose, fructose, ribose, xylose, arabinose, galactose, maltose, cellobiose, lactose, sucrose, trehalose, and maltotriose.

In the present specification, polysaccharides mean sugar in the broad sense, and are used to refer to materials widely present in the nature, such as α-cyclodextrin, and cellulose. Moreover, examples of derivatives of these saccharides include reducing sugar of the aforementioned saccharides {e.g., sugar alcohol [represented by the general formula: $HOCH_2(CHOH)nCH_2OH$ (with proviso that n is an integer of 2 to 5)]}, oxidizing sugar (e.g., aldonic acid, and uronic acid), amino acid, and thio acid.

Among them, sugar alcohol is preferable. Examples thereof include maltitol, and sorbit.

A mass ratio of a colorant, which is described later, to the water-soluble organic solvents largely affects ejection stability of an ink from a head, and moreover affects prevention of adherence of a waste ink in a maintenance device of an ink ejection device.

When a blended amount of the water-soluble organic solvents is large with a high colorant solid content, a moisture adjacent to ink meniscus of a nozzle is accelerated to evaporate, to thereby cause ejection failures.

<<Colorant>>

As for particularly preferable embodiments when the colorant is a pigment, there are the first to third embodiments below.

(1) In the first embodiment, the colorant contains at least one a hydrophilic group on a surface thereof, and contains a pigment, which is dispersible in water without a dispersing agent [may be referred to as a "self-dispersible pigment" hereinafter].

(2) In the second embodiment, the colorant are pigment dispersion elements each containing a pigment, a pigment dispersing agent, and a high molecular weight dispersion stabilizer, where the high molecular weight dispersion stabilizer is at least one selected from the group consisting of α-olefin-maleic anhydride copolymer represented by the following general formula (I), styrene-(meth)acryl copolymer, a water-soluble urethane resin, and a water-soluble polyester resin.

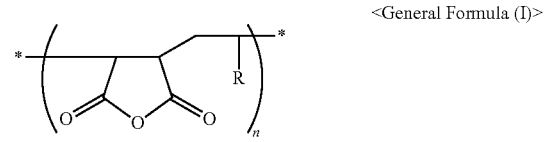

<General Formula (I)>

In the general formula (I), R is a C6-C30, preferably C12-C24, more preferably C18-C22 alkyl group; and n is an integer of 20 to 100. Moreover, the number average molecular weight thereof is 5,000 to 20,000.

As for the α-olefin-maleic anhydride copolymer represented by the following general formula (I), the one where alkyl groups having different carbon numbers are introduced randomly as R into the high molecular chain may be used.

(3) In the third embodiment, the colorant contains a polymer emulsion (an aqueous dispersion liquid of polymer particles each containing a colorant), in which a water-insoluble colorant or a low water-soluble colorant is contained in polymer particles.

As for the pigment, an organic pigment, or an inorganic pigment may be used. Note that, a dye may be used in combination with the pigment in order to adjust a color tone, as long as it does not deteriorate weather resistance of a resulting ink.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. Examples of the carbon black include those produced by the conventional methods such as a contact method, furnace method and thermal method.

Examples of the organic pigment include an azo pigment, a polycyclic pigment, a dye chelate, a nitro pigment, a nitroso pigment, and aniline black. Among them, an azo pigment, and a polycyclic pigment are more preferable. Note that, examples of the azo pigment include azo lake, an insoluble azo pigment, a condensed azo pigment, and a chelate azo pigment. Examples of the polycyclic pigment include a phthalocyanine pigment, a perylene pigment, a perynone pigment, an anthraquinone pigment, a quinacridon pigment, a dioxazine pigment, an indigo pigment, a thioindigo pigment, an isoindolinone pigment, and a quinophthalone pigment. Examples of the dye chelate include a basic dye chelate, and an acidic dye chelate.

A color of the colorant is appropriately selected depending on the intended purpose without any limitation. For example, there are a colorant for black, and colorants for colors. These may be used alone, or in combination.

Examples of the colorant for black include: carbon blacks (C.I. Pigment Black 7) such as furnace black, lamp black, acetylene black, and channel black; metals such as copper, and iron (C.I. Pigment Black 11); metal oxide, such as titanium oxide; and an organic pigment, such as aniline black (C.I. Pigment Black 1).

Examples of the colorant for colors include: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153, 183; C.I. Pigment Orange 5, 13, 16, 17, 36, 43, 51; C.I. Pigment Red 1, 2, 3, 5, 17, 22, 23, 31, 38, 48:2, 48:2 [Permanent Red 2B(Ca)], 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (quinacridon magenta), 123, 146, 149, 166, 168, 170, 172, 177, 178, 179, 185, 190, 193, 209, 219; C.I. Pigment Violet 1 (Rhodamine Lake), 3, 5:1, 16, 19, 23, 38; C.I. Pigment Blue 1, 2, 15 (phthalocyanine blue), 15:1, 15:2, 15:3 (phthalocyanine blue), 16, 17:1, 56, 60, 63; and C.I. Pigment Green 1, 4, 7, 8, 10, 17, 18, 36.

The self-dispersible pigment of the first embodiment is a pigment whose surface has been modified so that at least one hydrophilic group is, directly or via another atom group, bonded to the surface of the pigment. To achieve the surface modification, for example, the following methods are employed: a method in which a specific functional group (functional group such as a sulfone group and a carboxyl group) is chemically bonded to the surface of a pigment, or a method in which the surface of a pigment is subjected to a wet oxidization treatment using at least one of a hypohalous acid or a salt thereof. Among them, preferred is an embodiment where a carboxyl group is bonded to a surface of a pigment, and the pigment is dispersed in water. As the pigment is surface modified in the aforementioned manner, and a carboxyl group is bonded to a surface thereof, not only the dispersion stability but also higher print quality can be obtained, and the water resistance of recording media after printing is further improved.

An ink containing the self-dispersible pigment of the first embodiment is excellent in re-dispersibility after being dried, and therefore excellent printing can be performed with a simple cleaning operation without causing clogging, even when the printing operation is stopped for a long period, and the moisture in the ink present near the inkjet heat nozzle is evaporated.

The volume average particle diameter of the self-dispersible pigment in the ink is preferably 0.01 µm to 0.16 µm.

As for the self-dispersible carbon black, an ionic self-dispersible carbon black is preferable, and a self-dispersible carbon black, which is anionically charged, or cationically charged, is suitable.

Examples of the anionic hydrophilic group include —COOM, —SO$_3$M, —PO$_3$HM, —PO$_3$M$_2$, —SO$_2$NH$_2$, and —SO$_2$NHCOR (where M is a hydrogen atom, an alkali metal, ammonium, or organic ammonium, and R is a C1-C12 alkyl group, a substituted or unsubstituted phenyl group, or a substituted or unsubstituted naphthyl group). Among them, preferred is use of a color pigment on surface of which —COOM, and —SO$_3$M are bonded.

Examples of the alkali metal of "M" in the hydrophilic group include lithium, sodium, and potassium. Examples of the organic ammonium include mono, di, or trimethyl ammonium, mono, di, or triethyl ammonium, and mono, di, or trimethanol ammonium.

Examples of the method for attaining the anionically charged color pigment include: a method, in which a color pigment is subjected to an oxidization treatment with sodium hypochloride to introduce —COONa to a surface of a surface of the color pigment; a method for sulfonating a color pigment; and a method in which a color pigment is reacted with a diazonium salt.

As for the cationic hydrophilic group, for example, a quaternary ammonium group is preferable, and the quaternary ammonium group represented by any of the following structural formulae is more preferable. In the present invention, a pigment, in which the quaternary ammonium group represented by any of the following structural formulae is bonded to a surface of carbon black, is suitable.

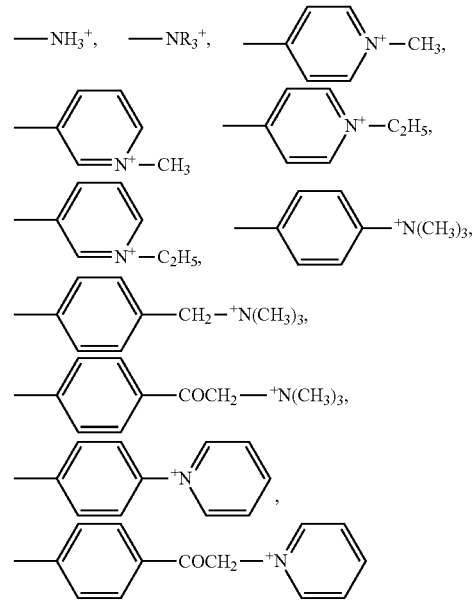

A method for producing a cationic self-dispersible carbon black to which the hydrophilic group is bonded is appropriately selected depending on the intended purpose without any limitation. As for a method for bonding N-ethyl pyridyl group represented by the following structural formula (A1), for example, there is a method where carbon black is treated with 3-amino-N-ethylpyridinium bromide.

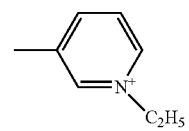

<Structural Formula A1>

The hydrophilic group may be bonded to a surface of carbon black via another atom group. Examples of another atom group include a C1-C12 alkyl group, a substituted or unsubstituted phenyl group, and a substituted or unsubstituted naphthyl group.

Specific examples of the case where the hydrophilic group is bonded to the surface of the carbon black via another atom group include —$C_2H_4COOM$ (where M is an alkali metal, or quaternary ammonium), —$PhSO_3M$ (where Ph is a phenyl group, and M is an alkali metal, or quaternary ammonium), and —$C_5H_{10}NH_3^+$.

In the second embodiment, the colorant contains a pigment, such as an inorganic pigment, an organic pigment, and a composite pigment, a pigment dispersing agent, and a high molecular weight dispersion stabilizer.

The high molecular weight dispersion stabilizer is a material effective for stably maintaining a dispersion state of pigment dispersion elements, which are finely dispersed in water with a pigment dispersing agent. The copolymer represented by the general formula (I), styrene-(meth)acrylate copolymer, water-soluble urethane resin, and water-soluble polyester resin are solids at room temperature, and are hardly soluble to cold water. They however exhibit an effect as a dispersion stabilizer, when they are dissolved in an alkali solution or alkali aqueous solution equivalent to or greater than (preferably 1.0 time or greater the acid value, but 1.5 times or less the acid value) the acid value of the copolymer or resin.

In order to dissolve the copolymer or resin in an alkali solution or alkali aqueous solution, heating and stirring are performed. In the case where a length of an olefin chain the α-olefin-maleic anhydride copolymer is long, however, it is relatively difficult to dissolve the copolymer, and insoluble residues may remain. In this case, the residues are removed with an appropriate filter, so that an effect as a dispersion stabilizer is not impaired.

Examples of the base in the alkali solution or alkali aqueous solution include: hydroxide of alkali metal, such as sodium hydroxide, potassium hydroxide, and lithium hydroxide; a basic material, such as ammonia, triethyl amine, and morpholine; and alcohol amine, such as triethanol amine, diethanol amine, N-methyldiethanol amine, 2-amino-2-ethyl-1,3-propanediol, and choline.

The α-olefin-maleic anhydride copolymer represented by the general formula (I) may be appropriately synthesized for use, or selected from commercial products. Examples of the commercial product thereof include T-YP112, T-YP115, T-YP114, T-YP116 (all manufactured by SEIKO PMC CORPORATION).

The styrene-(meth)acrylate copolymer may be appropriately synthesized for use, or selected from commercial products. Examples of the commercial product thereof include: JC-05 (manufactured by SEIKO PMC CORPORATION); and ARUFON UC-3900, ARUFON UC-3910, ARUFON UC-3920 (all manufactured by TOAGOSEI CO., LTD.).

The water-soluble urethane resin may be appropriately synthesized for use, or selected from commercial products. Examples of the commercial product thereof include TAKE-LAC W-5025, TAKELAC W-6010, TAKELAC W-5661 (all manufactured by Mitsui Chemicals, Inc.).

The water-soluble polyester resin may be appropriately synthesized for use, or selected from commercial products. Examples of the commercial product thereof include: NICHIGO POLYESTER W-0030, NICHIGO POLYESTER W-0005S30WO, NICHIGO POLYESTER WR-961 (all manufactured by Nippon Synthetic Chemical Industry Co., Ltd.); and PESRESIN A-210, PESRESIN A-520 (manufactured by TAKAMATSU OIL & FAT CO., LTD.).

The acid value of the high molecular weight dispersion stabilizer is preferably 40 mgKOH/g to 400 mgKOH/g, more preferably 60 mgKOH/g to 350 mgKOH/g. When the acid value thereof is lower than 40 mgKOH/g, the solubility thereof to an alkali solution may be poor. When the acid value thereof is higher than 400 mgKOH/g, the viscosity of the pigment becomes excessively high to thereby impair ejectability of a resulting ink, or dispersion stability of the pigment dispersed element may be low.

The weight average molecular weight of the high molecular weight dispersion stabilizer is preferably 5,000 to 20,000. When the weight average molecular weight thereof is less than 5,000, dispersion stability of the pigment dispersion element may be low. When the weight average molecular weight thereof is greater than 20,000, solubility thereof to an alkali solution may be poor, or the viscosity may be high.

An amount of the high molecular weight dispersion stabilizer is preferably 1 part by mass to 100 parts by mass on solid basis, more preferably 5 parts by mass to 50 parts by mass in solid basis, relative to 100 parts by mass of the pigment. When the amount thereof is less than 1 part by mass, an effect of stabilizing the dispersion may not be exhibited. When the amount thereof is greater than 100 parts by mass, the viscosity of a resulting ink becomes high to impair ejectability of the ink from a nozzle, or cost efficiency is low.

In the second embodiment, the colorant preferably contains a pigment dispersing agent. The pigment dispersing agent is preferably an anionic surfactant, or a nonionic surfactant having a HLB value of 10 to 20.

Examples of the anionic surfactant include polyoxyethylene alkyl ether acetic acid salt, alkyl benzene sulfonic acid salt (e.g., salts of $NH_4$, Na, and Ca), alkyldiphenyl ether disulfonic acid salt (e.g., salts of $NH_4$, Na, and Ca), dialkyl succinate sodium sulfonate (Na salt), a sodium naphthalene sulfonate-formalin condensate (Na salt), polyoxyethylene polycyclic phenyl ether sulfuric acid ester salt (e.g., of $NH_4$, and Na), lauric acid salt, polyoxyethylene alkyl ether sulfate salt, and oleic acid salt. Among them, particularly preferred are Na salt of dioctyl sulfosuccinic acid, and $NH_4$ salt of polyoxyethylene styrene phenyl ether sulfonic acid.

Examples of the nonionic surfactant having the HLB value of 10 to 20 include polyoxyethylene alkyl ether, polyoxyalkylene alkyl ether, polyoxyethylene polycyclic phenyl ether, sorbitan fatty acid ester, polyoxyethylene sorbitan fatty acid ester, polyoxyethylene alkyl phenyl ether, polyoxyethylene alkyl amine, polyoxyethylene alkyl amide, and acetylene glycol.

Among them, particularly preferred are polyoxyethylene lauryl ether, polyoxyethylene-β-naphthyl ether, polyoxyethylene sorbitan mono-oleate, and polyoxyethylene styrene phenyl ether.

An amount of the pigment dispersing agent is preferably 1 part by mass to 100 parts by mass, more preferably 10 parts by mass to 50 parts by mass, relative to 100 parts by mass of the pigment. When the amount of the pigment dispersing agent is excessively small, the pigment cannot be sufficiently finely dispersed. When the amount thereof is excessively large, an excess amount thereof which is not adsorbed adversely affect properties of a resulting ink, which may cause blurring of an image, water resistance, and abrasion resistance.

The volume average particle diameter of the pigment dispersion elements in the ink is preferably 150 nm or smaller, more preferably 100 nm or smaller. When the volume average particle diameter thereof is greater than 150 nm, ejection stability is sharply deteriorated, and clogging of nozzles or bending of ink jet tend to occur. When the volume average particle diameter thereof is 100 nm or smaller, on the other hand, ejection stability is improved, and moreover chroma of an image is improved.

The pigment dispersion elements uniformly finely dispersed in water with the pigment dispersing agent can be produced by dissolving the pigment dispersing agent in an aqueous medium, and adding the pigment thereto to sufficiently wet the pigment, followed by stirring at high speed by means of a homogenizer, or a disperser using balls, such as a bead mill and a ball mill, or a knead disperser using a shearing force, such as a roll mill, or a ultrasonic wave disperser. After the aforementioned kneading and dispersing operation, however, it is often leave coarse particles, which may cause clogging of an inkjet nozzle or supply channel. Therefore, it is preferred that particles having particle diameters of 1 µm or greater be removed with a filter, or a by means of a centrifuge.

In addition to the aforementioned pigment, use of a polymer emulsion, in which polymer particles each contain a pigment is preferable as the water-dispersible colorant of the third embodiment. The polymer emulsion, in which polymer particles each contain a pigment, is a polymer emulsion, in which a pigment is encapsulated in polymer particles, or a pigment is adsorbed on surfaces of polymer particles. In this case, all of the pigment particles are not necessarily encapsulated or absorbed in or on the polymer particles, and the pigment particles may be dispersed in the emulsion as long as they do not adversely affect the obtainable effect of the present invention. Examples of the polymer constituting the polymer emulsion (the polymer of the polymer particles) include a vinyl-based polymer, a polyester-based polymer, and a polyurethane-based polymer. Among them, preferred are the vinyl-based polymer and the polyester-based polymer, and more preferred are polymers disclosed in Japanese Application Laid-Open (JP-A) Nos. 2000-53897, and 2001-139849.

In the third embodiment, a composite pigment, in which a typical organic pigment or inorganic pigment is coated with an organic pigment or carbon black, is suitably used. The composite pigment can be produced by a method for precipitating an organic pigment in the presence of inorganic pigment particles, or a mechanochemical method in which an inorganic pigment and an organic pigment are mechanically mixed and ground. If necessary, moreover, a layer of an organosilane compound generated from polysiloxane or alkyl silane is provided between the inorganic pigment and the organic pigment so that the adhesion between the inorganic pigment and the organic pigment can be improved.

As for the organic pigment, examples of the black pigment include aniline black, and examples of the color pigment include anthraquinone, phthalocyanine blue, phthalocyanine green, diazo, monoazo, pyranthrone, perylene, heterocyclic yellow, quinacridon, and (thio)indigoid. Among them, carbon black, a phthalocyanine-based pigment, a quinacridon-based pigment, a monoazo yellow-based pigment, a disazo yellow-based pigment, and a heterocyclic yellow pigment are preferable in view of coloring abilities thereof.

Typical examples of the phthalocyanine blue include copper phthalocyanine blue and a derivative thereof (C.I. Pigment Blue 15:3, 15:4), and aluminum phthalocyanine.

Examples of the quinacridon include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19, and C.I. Pigment Violet 42.

Examples of the monoazo yellow include C.I. Pigment Yellow 74, C.I. Pigment Yellow 109, C.I. Pigment Yellow 128, and C.I. Pigment Yellow 151.

Examples of the disazo yellow include C.I. Pigment Yellow 14, C.I. Pigment Yellow 16, and C.I. Pigment Yellow 17.

Examples of the heterocyclic yellow include C.I. Pigment Yellow 117, and C.I. Pigment Yellow 138.

Other appropriate color pigments are those described in The Color Index, $3^{rd}$ edition (The Society of Dyers and Colourists, 1982).

Examples of the inorganic pigment include titanium dioxide, silica, alumina, iron oxide, iron hydroxide, and tin oxide. As for the particle shape thereof, those having a small aspect ratio are preferable, and the spherical shapes are more preferable. In the case where a color material is adsorbed on surfaces thereof, a color of the inorganic pigment is preferably clear or white. In the case where a black material is adsorbed thereon, the black inorganic pigment may be used. A primary particle diameter of the inorganic pigment particles is preferably 100 nm or smaller, more preferably 5 nm to 50 nm.

A mass ratio of the inorganic pigment particles to a colorant, which is an organic pigment or carbon black, is preferably 3:1 to 1:3, more preferably 3:2 to 1:2. When the mass of the colorant is small, coloring ability or tinting ability may be low. When the mass of colorant is large, transparency or color tone may be impaired.

As the colorant particles in which the inorganic pigment particles coated with the organic pigment or carbon black, a silica-carbon black composite material, a silica-phthalocyanine PB 15:3 composite material, a silica-diazo yellow composite material, and a silica-quinacridon PR122 composite material, which are manufactured by TODA KOGYO CORPORATION, are suitably used because these material have the small average primary particle diameters.

For example, if inorganic pigments having a primary particle diameter of 20 nm are coated with an equipment of an organic pigment, the coated particles will have a primary diameter of approximately 25 nm. Therefore, provided that these particles are dispersed maintaining the state of primary particles by using an appropriate dispersing agent, an extremely finely dispersed pigment ink having a dispersed particle diameter of 25 nm can be obtained. Note that, not only the organic pigment present on the surface of the composite pigment contributes to the dispersion state thereof, but also the characteristics of the inorganic pigment present in the center of the composite pigment affect the dispersion state through the about 2.5 nm-thick layer of the organic pigment. Therefore, it is also important that a pigment dispersing agent that can stabilize both the organic pigment and inorganic pigment in the composite pigment in the dispersion is selected.

As for an amount of the colorant in the ink, a solid content of the colorant is preferably 2% by mass to 15% by mass, more preferably 3% by mass to 12% by mass. When the amount thereof is less than 2% by mass, coloring ability of a resulting ink and image density of a resulting image may be low. When the amount thereof is greater than 15% by mass, a viscosity of a resulting ink increases to impair an ejectability of the ink, and it is also not preferable in view of cost efficiency.

<<Surfactant>>

The surfactant is preferably a surfactant, which does not impair dispersion stability regardless of a type of the colorant for use, or a combination of wetting agents, has low surface tension, and high penetration ability, and high leveling ability. The surfactant is preferably at least one selected from the group consisting of an anionic surfactant, a nonionic surfactant, a silicone-based surfactant, and a fluorine-based surfactant. Among them, particularly preferred are a silicone-based surfactant, and a fluorine-based surfactant.

These surfactants may be used alone, or in combination.

As for the fluorine-based surfactant, a number of carbon atoms substituted with fluorine is preferably 2 to 16, more preferably 4 to 16. When the number of carbon atoms substituted with fluorine is less than 2, an effect of fluorine may not be exhibited. When the number thereof is greater than 16, a problem may be caused in storage stability of the ink.

Examples of the anionic fluorine-based surfactant include a perfluoroalkyl sulfonic acid compound, and a perfluoroalkyl carboxylic acid compound. Examples of the perfluoroalkyl sulfonic acid compound include perfluoroalkyl sulfonic acid, and perfluoroalkyl sulfonic acid salt. Examples of the perfluoroalkyl carboxylic acid compound include perfluoroalkyl carboxylic acid, and perfluoroalkyl carboxylic acid salt.

Examples of the nonionic fluorine-based surfactant include a perfluoroalkyl phosphate compound, a perfluoroalkyl ethylene oxide adduct, and a polyoxyalkylene ether polymer compound containing a perfluoroalkyl ether group at a side chain thereof.

Among them, a polyoxyalkylene ether polymer compound containing a perfluoroalkyl ether group at a side chain thereof is preferable, as it is less foamable. Examples thereof include polyoxyalkylene ether polymer containing a perfluoroalkyl ether group at a side chain thereof, sulfate of polyoxyalkylene ether polymer containing a perfluoroalkyl ether group at a side chain thereof, and a salt of polyoxyalkylene ether polymer containing a perfluoroalkyl ether group at a side chain thereof. A fluorine-based surfactant represented by the following general formula (1) is particularly preferable.

CF$_3$CF$_2$(CF$_2$CF$_2$)$_m$—CH$_2$CH$_2$O(CH$_2$CH$_2$O)$_n$H  General Formula (1)

In the general formula (1), m and n are each an integer of 0 or greater, and in order to impart water solubility, m is preferably 0 to 10 and n is preferably 0 to 40.

Examples of the perfluoroalkyl phosphate compound include perfluoloalkyl phosphate, and perfluoroalkyl phosphoric acid salt.

Examples of a counter ion of the salt in any of the aforementioned fluorine-based surfactants include Li, Na, K, NH$_4$, NH$_3$CH$_2$CH$_2$OH, NH$_2$(CH$_2$CH$_2$OH)$_2$, and NH(CH$_2$CH$_2$OH)$_3$.

As for specific examples of the fluorine-based surfactant, compounds represented by the following general formulae (2) to (10) are suitably used.

(1) Anionic Fluorine-Based Surfactant

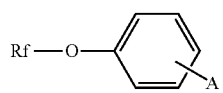

General Formula (2)

In the general formula (2), Rf is a mixture of fluorine-containing hydrophobic groups represented by the following structural formulae; and A is —SO$_3$X, —COOX, or —PO$_3$X [where X is a counter anion, specific examples of which include H, Li, Na, K, NH$_4$, NH$_3$CH$_2$CH$_2$OH, NH$_2$(CH$_2$CH$_2$OH)$_2$, and NH(CH$_2$CH$_2$OH)$_3$].

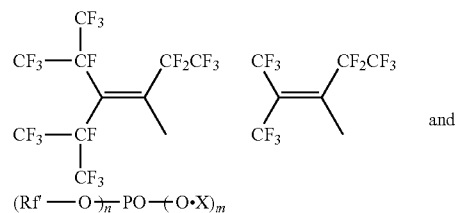

General Formula (3)

In the general formula (3), Rf is the fluorine-containing group represented by the following structural formula, X is the same as in the general formula (2), n is an integer of 1 or 2, and m is 2-n.

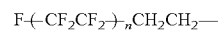

In the formula above, n is an integer of 3 to 10.

Rf'—S—CH$_2$CH$_2$—COO.X    General Formula (4)

In the general formula (4), Rf' is the same as in the general formula (3), and X is the same as in the general formula (2).

Rf'—SO$_3$.X    General Formula (5)

In the general formula (5), Rf' is the same as in the general formula (3), and X is the same as in the general formula (2).

(2) Nonionic Fluorine-Based Surfactant

Rf—O—(CH$_2$CH$_2$O)$_n$H    General Formula (6)

In the general formula (6), Rf is the same as in the general formula (2), and n is an integer of 5 to 20.

Rf'—O—(CH$_2$CH$_2$O)$_n$H    General Formula (7)

In the general formula (7), Rf' is the same as in the general formula (3), and n is an integer of 1 to 40.

(3) Amphoteric Fluorine-Based Surfactant

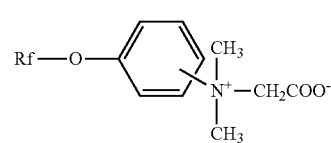

General Formula (8)

In the general formula (8), Rf is the same as in the general formula (2).

(4) Oligomer-Type Fluorine-Based Surfactant

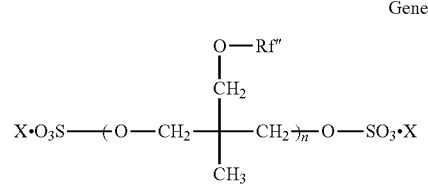

General Formula (9)

In the general formula (9), Rf" is the fluorine-containing group represented by the following structural formula, n is an integer of 0 to 10, and X is the same as in the general formula (2).

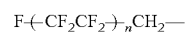

In the formula above, n is an integer of 1 to 4.

General Formula (10)

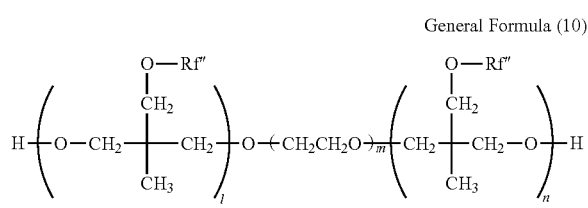

In the general formula (10), Rf' is the same as in the general formula (9), l is an integer of 0 to 10, m is an integer of 0 to 10, and n is an integer of 0 to 10.

As for the fluorine-based surfactant, a commercial product may be used. Examples of the commercial product thereof include: SURFLON S-111, S-112, S-113, S-121, S-131, S-132, S-141, S-145 (all manufactured by ASAHI GLASS CO., LTD.); FLOURAD FC-93, FC-95, FC-98, FC-129, FC-135, FC-170C, FC-430, FC-431 (all manufactured by Sumitomo 3M Limited); MEGAFACE F-470, F-1405, F-474 (all manufactured by DIC CORPORATION); Zonyl TBS, FSP, FSA, FSN-100, FSN, F50-100, FSO, FS-300, UR (all manufactured by Du Pont Kabushiki Kaisha); FT-110, FT-250, FT-251, FT-400S, FT-150, FT-400SW (all manufactured by NEOS COMPANY LIMITED); and PolyFox PF-136A, PF-156A, PF-151N, PF-154, PF-159 (all manufactured by Omnova Solutions, Inc.). Among them, particularly preferred are FS-300 manufactured by Du Pont Kabushiki Kaisha, FT-110, FT-250, FT-251, FT-400S, FT-150, and FT-400SW, all manufactured by NEOS COMPANY LIMITED, and PolyFox PF-151N manufactured by Omnova Solutions, Inc., in view of excellent print quality and particularly improvements in coloring ability, and uniform dying ability to paper.

The silicone-based surfactant is appropriately selected depending on the intended purpose without any limitation, and examples thereof include side chain-modified polydimethylsiloxane, both terminal-modified polydimethylsiloxane, one terminal-modified polydimethylsiloxane, and side chain and both terminals-modified polydimethylsiloxane. Among them, particularly preferred is a polyether-modified silicone-based surfactant containing a polyoxyethylene group and polyoxyethylene polyoxypropylene group as a modified group, as it has excellent properties as an aqueous surfactant.

The silicone-based surfactant may be appropriately synthesized for use, or selected from commercial products. The commercial products thereof are readily available, for example, from BYK Japan K.K., Shin-Etsu Chemical Co., Ltd., Dow Corning Toray Co., Ltd., Nihon Emulsion Co., Ltd., and KYOEISHA CHEMICAL CO., LTD.

The polyether-modified silicone-based surfactant is appropriately selected depending on the intended purpose without any limitation, and examples thereof include a compound, in which a polyalkylene oxide structure represented by the following general formula (11) is introduced into a Si site of the side chain of dimethyl polysiloxane.

General Formula (11)

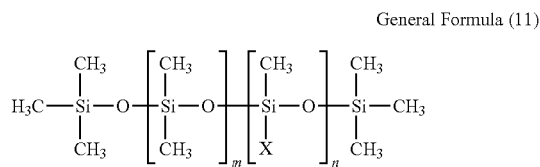

X=—R(C$_2$H$_4$O)$_a$(C$_3$H$_6$O)$_b$R'

In the formulae above, m, n, a, and b are each an integer, and R and R' are each an alkyl group, or an alkylene group.

The aforementioned polyether-modified silicone-based surfactant can be selected from commercial products. Examples of the commercial product thereof include: KF-618, KF-642, KF-643 (all manufactured by Shin-Etsu Chemical Co., Ltd.); EMALEX-SS-5602, SS-1906 EX (both manufactured by Nihon Emulsion Co., Ltd.); FZ-2105, FZ-2118, FZ-2154, FZ-2161, FZ-2162, FZ-2163, FZ-2164 (all manufactured by Dow Corning Toray Co., Ltd.); and BYK-33, BYK-387 (both manufactured by BYK Japan KK).

Examples of the anionic surfactant include an acetic acid salt of polyoxyethylene alkyl ether, dodecylbenzene sulfonic acid salt, lauric acid salt, and polyoxyethylene alkyl ether sulfate salt.

Examples of the nonionic surfactant include polyoxyethylene alkyl ether, polyoxypropylene polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide.

An amount of the surfactant in the ink is preferably 0.001% by mass to 5% by mass, more preferably 0.05% by mass to 1% by mass. When the amount thereof is less than 0.001% by mass, an effect obtainable by adding the surfactant may be low. When the amount thereof is greater than 5% by mass, there is no difference in the effect even through the amount thereof is increased.

<<Water>>

As for the water, pure water (e.g., ion-exchanged water, ultrafiltration water, Milli-Q water, and distilled water) or ultra pure water can be used.

<<Water-Dispersible Resin>>

As for the water-dispersible resin, a water-dispersible resin having excellent film formability (image formability), high water repellency, high water resistance, and high weather resistance is effective for formation of an image having high water resistance and high image density (high coloring ability). Examples of the water-dispersible resin include a condensed synthetic resin, an addition synthetic resin and a natural polymer compound.

Examples of the condensed synthetic resin include a polyester resin, a polyurethane resin, a polyepoxy resin, a polyamide resin, a polyether resin, a poly(meth)acrylic resin, an acryl-silicone resin, a styrene-acrylic resin, and a fluororesin.

Examples of the addition synthetic resin include a polyolefin resin, a polystyrene resin, a polyvinyl alcohol resin, a polyvinyl ester resin, a polyacrylic acid resin, and an unsaturated carboxylic acid resin.

Examples of the natural polymer compound include cellulose, rosin, and natural rubbers.

Among them, particularly preferred are an anionic water-dispersible resin, a styrene-acrylic resin, a urethane resin, and acryl-silicone resin particles.

There is no problem in using two or more resins selected from the above-listed water-dispersible resins in combination.

As for the water-dispersible resin, a homopolymer may be used, or a copolymer may be used as a composite resin. Moreover, the water-dispersible resin for use may have a monophase structure or core-shell structure, or may be prepared as a power-feed emulsion.

As the water-dispersible resin, it is possible to use a resin itself having a hydrophilic group and self-dispersibility, and a resin itself having no dispersibility but to which the dispersibility is imparted with use of a surfactant or another resin having a hydrophilic group. Among them, particularly preferred are an ionomer of a polyester resin or a polyurethane resin, and an emulsion of resin particles obtained through emulsion polymerization or suspension polymerization of an unsaturated monomer.

In case of emulsion polymerization of an unsaturated monomer, a resin emulsion is obtained by carrying out a reaction in water to which an unsaturated monomer, a polymerization initiator, a surfactant, a chain transfer agent, a chelating agent and a pH adjustor are added. Thus, a water-dispersible resin can be easily obtained, and desired properties are easily obtained because the resin components can be easily changed.

Examples of the unsaturated monomer include unsaturated carboxylic acid, a monofunctional or polyfunctional (meth)acrylic acid ester monomer, a (meth)acrylic acid amide monomer, an aromatic vinyl monomer, a vinyl cyano compound monomer, a vinyl monomer, an allyl compound monomer, an olefin monomers, a diene monomer, and an oligomer containing a unsaturated carbon. These may be used alone, or in combination. By combining these monomers, properties of the resulting resin can be flexibly modified. The properties of the resulting resin can be also modified with use of an oligomer type polymerization initiator, through a polymerization reaction or graft reaction.

Examples of the unsaturated carboxylic acid include acrylic acid, methacrylic acid, itaconic acid, fumaric acid, and maleic acid.

Examples of the monofunctional (meth)acrylic acid ester monomer include methyl methacrylate, ethyl methacrylate, and isopropyl methacrylate.

Examples of the polyfunctional (meth)acrylic acid ester include ethylene glycol dimethacrylate, diethylene glycol dimethacrylate, and triethylene glycol dimethacrylate.

Examples of the (meth)acrylic acid amide monomer include acryl amide, methacryl amide, N,N-dimethyl acryl amide, methylene bisacryl amide, and 2-acrylamide-2-methylpropane sulfonic acid.

Examples of the aromatic vinyl monomer include styrene, α-methyl styrene, vinyl toluene, 4-t-butyl styrene, chlorostyrene, vinyl anisole, vinyl naphthalene, and vinyl benzene.

Examples of the vinyl cyano compound monomer include acrylonitrile, and methacrylonitrile.

Examples of the vinyl monomer include vinyl acetate, vinylidene chloride, vinyl chloride, vinyl ether, vinyl ketone, vinyl pyrrolidone, vinylsulfonic acid or a salt thereof, vinyl trimethoxysilane, and vinyl triethoxysilane.

Examples of the allyl compound monomer include allyl sulfonic acid or a salt thereof, allyl amine, allyl chloride, diallyl amine, and diallylmethyl ammonium salt.

Examples of the olefin monomer include ethylene, and propylene.

Examples of the diene monomer include butadiene, and chloroprene.

Examples of the oligomer containing an unsaturated carbon include a styrene oligomer containing a methacryloyl group, a styrene-acrylnitrile oligomer containing a methacryloyl group, a methyl methacrylate oligomer containing a methacryloyl group, a dimethylsiloxane oligomer containing a methacryloyl group, and a polyester oligomer containing an acryloyl group.

The water-dispersible resin suffers from breakage of the molecular chains, such as dispersion breakage and hydrolysis, in the presence of a strong alkali or strong acid, and thus the pH of the water-dispersible resin is preferably 4 to 12, and particularly, from the view point of miscibility with a water-dispersible colorant, it is more preferably 6 to 11, and still more preferably 7 to 9.

The average particle diameter of the water-dispersible resin relates to a viscosity of the dispersion liquid. In the case of water-dispersible resins having the same composition, the smaller the particle diameter is, the higher the viscosity is with the same solid content. The average particle diameter (D50) of the water-dispersible resin is preferably 50 nm or greater to prevent the resulting ink from having an excessively high viscosity. When the average particle diameter of the water-dispersible resin is several tens micrometers, such the water-dispersible resin cannot be used because the diameters of the water-dispersible resin are greater than those of nozzle holes of an inkjet head. When the diameters of the water-dispersible resin are smaller than those of nozzle holes but particles having large particle diameters are present in an ink, the ejection stability of the ink may be impaired. In order not to impair the ejection stability of the ink, the average particle diameter (D50) is more preferably 200 nm or smaller, further more preferably 150 nm or smaller.

The water-dispersible resin preferably has a function to form a coating at normal temperature to fix the water-dispersible colorant on a surface of paper, to thereby improve fixability of the colorant. To this end, the minimum film forming temperature (MFT) of the water-dispersible resin is preferably 30° C. or lower. When the glass transition temperature of the water-dispersible resin is lower than −40° C., tucking occurs in a printed product because of the increased viscosity of the resin coating. Therefore, the glass transition temperature thereof is −40° C. or higher.

An amount of the water-dispersible resin in the ink is preferably 2% by mass to 30% by mass on solid basis, more preferably 5% by mass to 25% by mass.

The solids content of the colorant, pigment in the colorant, and the water-dispersible resin can be measured, for example, by a method, in which only the colorant and the water-dispersible resin are separated from the ink. In the case where a pigment is used as a colorant, moreover, a ratio of the colorant and the water-dispersible resin can be measured by evaluating a mass reduction rate through thermal mass spectrometry. In the case where a molecular structure of the colorant is known, moreover, a solid content of the colorant, which may be a pigment or a dye, can be determined by NMR. In the case where the colorant is an inorganic pigment containing a heavy metal atom in a molecule skeleton thereof, a metal-containing organic pigment, or a metal-containing dye, a solid content of the colorant can be determined by X-ray fluorescence spectrometry.

<<Other Components>>

The aforementioned other components are appropriately selected depending on the intended purpose without any limitation, and examples thereof include a penetrating agent, a pH regulator, an antiseptic-antifungal agent, a chelating agent, an anti-rust agent, an antioxidant, an ultraviolet absorber, an oxygen absorber, and a photostabilizer.

—Penetrating Agent—

In order to achieve both permeation of an ink and solubility thereof to water, it is preferred that the ink contain at least one C8-C11 non-wetting polyol compound or glycol ether compound as a penetrating agent. In the present embodiment, the term "non-wetting" means to have solubility of 0.2% by mass to 5.0% by mass in water of 25° C.

As for the penetrating agent, a 1,3-diol compound represented by the following general formula (12) is preferable, and 2-ethyl-1,3-hexanediol [solubility: 4.2% (25° C.)], and 2,2,4-trimethyl-1,3-pentanediol [solubility: 2.0% (25° C.)] are particularly preferable.

General Formula (12)

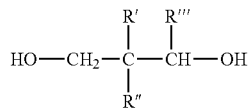

In the general formula (12), R' is a methyl group, or an ethyl group, R" is a hydrogen atom, or a methyl group, and R'" is an ethyl group, or a propyl group.

Examples of other non-wetting polyol compounds include aliphatic diol, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other penetrating agents used in combination are not appropriately selected depending on the intended purpose without any limitation, provided that they are dissolved in an ink and can adjust the ink to give the predetermined physical properties. Examples thereof include: alkyl or aryl ether of polyhydric alcohol, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohol, such as ethanol.

An amount of the penetrating agent in the ink is preferably 0.1% by mass to 4.0% by mass. When the amount thereof is less than 0.1% by mass, prompt drying properties cannot be attained, and therefore a resulting image may be blurred. When the amount thereof is greater than 4.0% by mass, dispersion stability of the colorant is impaired so that nozzles tend to be clogged, or penetration of an ink to a recording medium may become excessively high to thereby cause reduction in an image density or strike-through.

—pH Regulator—

The pH regulator is appropriately selected depending on the intended purpose without any limitation, provided that it does not adversely affect an ink to be prepared, and can adjust pH of the ink to the range of 7 to 11. Examples thereof include alcohol amine, hydroxide of an alkali metal element, hydroxide of ammonium, phosphonium hydroxide, and carbonate of alkali metal.

Examples of the alcohol amine include diethanol amine, triethanol amine, and 2-amino-2-ethyl-1,3-propanediol.

—Antiseptic-Antifungal Agent—

Examples of the antiseptic-antifungal agent include sodium dehydroacetate, sodium sorbate, sodium 2-pyridinethiol-1-oxide, sodium benzoate, and sodium pentachlorophenol.

—Antioxidant—

Examples of the antioxidant include a phenolic antioxidant (including hindered phenolic antioxidant), an amine antioxidant, a sulfuric antioxidant, and a phosphoric antioxidant.

Examples of the phenolic antioxidant (including hindered phenolic antioxidant) include butylated hydroxyanisole, and 2,6-di-tert-butyl-4-ethyl phenol.

Examples of the amine antioxidant include phenyl-β-naphthyl amine, and α-naphthyl amine.

Examples of the sulfuric antioxidant include dilauryl-3,3'-thiodipropionate.

Examples of the phosphoric antioxidant include triphenyl phosphate.

—Ultraviolet Absorber—

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of the benzophenone ultraviolet absorber include 2-hydroxy-4-n-octoxybenzophenone.

Examples of the benzotriazole ultraviolet absorber include 2-(2'-hydroxy-5'-tert-octylphenyl)benzotriazole.

Examples of the salicylate ultraviolet absorber include phenyl salicylate, p-tert-butylphenyl salicylate, and p-octylphenyl salicylate.

Examples of the cyanoacrylate ultraviolet absorber include ethyl-2-cyano-3,3'-diphenyl acrylate.

Examples of the nickel complex salt ultraviolet absorber include nickelbis(octylphenyl)sulfide.

<<Production of Inkjet Ink>>

The ink for use in the present invention is produced by dispersing or dissolving, in an aqueous medium, a colorant, a water-soluble organic solvent, a surfactant, a penetrating agent, and water, and optionally other component, optionally followed by stirring and mixing. The dispersing or dissolving can be performed, for example, by a sand mill, a homogenizer, a ball mill, a paint shaker, or an ultrasonic disperser, and the stirring and mixing can be performed by an agitator using a typical agitating blade, a magnetic stirrer, or a high-speed disperser.

<<Physical Properties of Inkjet Ink>>

The physical properties of the ink are appropriately selected depending on the intended purpose without any limitation. For example, the viscosity and surface tension thereof are within the following ranges.

The viscosity of the ink at 25° C. is preferably 5 mPa·s to 25 mPa·s. When the viscosity of the ink is 5 mPa·s or greater, an effect of improving print density and quality of printed characters can be attained. When the viscosity of the ink is 25 mPa·s or less, moreover, excellent ejection ability can be secured.

The viscosity can be measured at 25° C., for example, by means of a viscometer (RE-550L, manufactured by Toki Sangyo Co., Ltd.).

The surface tension of the ink at 25° C. is preferably 30 mN/m or lower, more preferably 28 mN/m or lower. When the surface tension thereof is 30 mN/m or lower, penetration ability is improved to reduce beading, and therefore drying properties of the ink at the time of printing on plain paper are excellent. Moreover, the coloring ability of the ink is improved, and formation of white missing spots in a solid image is prevented, as the ink is easily wet to a pre-treatment layer. When the surface tension thereof is greater than 30 mN/m, leveling of the ink is not easily occur on a recording medium, and therefore a drying time may be prolonged (drying properties may be impaired).

The ink is suitably used in a printer equipped with an inkjet head, which is any one selected from a piezo-type head, which is configured to eject ink droplets by deforming a vibration plate constituting a wall of an ink channel using a piezoelectric element as a pressure generating unit to pressurize an ink in the ink channel to thereby change the volume in the ink channel (see JP-A No. 02-51734), and an electrostatic-type head, which is configured to eject ink droplets by providing a vibration plate constituting a wall of an ink channel and an electrode to face to each other, deforming the vibration plate with electrostatic force generated between the vibration plate and the electrode, to thereby change the volume in the ink channel (see JP-A No. 06-71882).

<Recording Medium>

The recording medium contains a support, and a coating layer at least one surface of the support.

The recording medium is not particularly limited, and various recording media can be used as the recording medium. Examples thereof include plain paper, glossy paper, special paper, cloth, a film, an OHP sheet, and a general-purpose printing sheet. These may be used alone, or in combination.

In order to form an image having an excellent image quality (image density, chroma, no beading, no color bleeding), high gloss, and excellent fixing ability without smearing, it is necessary to use a typical printing sheet having the liquid absorption properties within the certain range. Specifically, used is a printing sheet, in which a transfer amount of pure water to a recording medium at contact time of 100 ms, determined by measuring by means of a dynamic scanning absorptometer, is 1 mL/m$^2$ to 15 mL/m$^2$, preferably 2 mL/m$^2$ to 13 mL/m$^2$. When the transfer amount of the pre-treatment liquid, ink, and pure water at the contact time of 100 ms is too small, beading or color bleeding tends to occur. When the transfer amount thereof is too large, a diameter of an ink dot after the recording becomes smaller than an ideal diameter, to thereby bing unable to form a desirable solid image.

The dynamic scanning absorptometer (Journal from Japan Technical Association of the Pulp and Paper Industry, Vol. 48, May 1994, pp 88-92, Kukan Shigenori) is a device that can accurately measure a liquid absorption amount during a very short period of time. This device automates the measurement through a method (i) in which a speed of liquid absorption is directly read from a movement of meniscus in a capillary; or a method (ii), in which a disc-shaped sample is prepared, an liquid absorption head is scanned over the sample in a spiral manner, the scanning speed is automatically changed according to a predetermined pattern, and one sample is used for measurements of a required number of dots. The head for supplying liquid to the paper sample is connected to the capillary via a Teflon (registered trademark) tube. The position of the meniscus in the capillary is automatically read by an optical sensor. Specifically, the transfer amount of pure water is measured by means of a dynamic scanning absorptometer (K350 series D, manufactured by Kyowa Seiko Co., Ltd.). The transfer amount of pure time at the contact time of 100 ms can be determined by interpolation of the measurements of the transfer amount with contact times around each contact time.

As for the printing sheet having the certain range of the liquid absorption properties, a commercial product can be used. Examples of the commercial product include: Ricoh Business Coat Gloss 100 (manufactured by Ricoh Company Limited); OK Top Coat+, OK Kanefuji+, and SA Kanefuji+ (all manufactured by Oji Paper Co., Ltd.); Super MI Dull, Aurora Coat, and Space DX (all manufactured by NIPPON PAPER INDUSTRIES CO., LTD.); a Mat, and Mu Coat (both manufactured by Hokuetsu Paper Mills, Ltd.); Raicho Art, and Raicho Super Art (all manufactured by Chuetsu Pulp & Paper Co., Ltd.); and Pearl Coat N (manufactured by Mitsubishi Paper Mills Limited).

<<Image Formation>>

The image formation is to form an image on a printing sheet by applying stimuli (energy) to the ink to eject the ink on a surface of a recording medium at which a coating layer is provided. The image formation is achieved by employing various conventional inkjet recording methods. Examples thereof include an inkjet recording method where a head is scanned, and an inkjet recording method where lined heads are used to record an image on a printing sheet.

A driving system of a recording head, which is the ink jetting unit in the image forming step is not particularly limited. For example, a head equipped with a piezoelectric element actuator using PZT, a head of a system using thermal energy, or an on-demand head using an actuator utilizing electrostatic force may be used. Alternatively, recording may be performed by a continuous-jetting charge-controlling head.

<Fixing Step and Fixing Unit>

The fixing step contains heating the image to the range of 100° C. to 150° C. during, or after, or during and after the image formation in the image forming step, to fix the image to the recording medium. The fixing step is performed by the fixing unit.

The fixing can be performed by infrared drying equipment, microwave drying equipment, a roll heater, a drum heater, or hot blast.

<Post-Treatment Step and Post-Treatment Unit>

The post-treatment step contains applying a post-treatment liquid containing at least a water-dispersible resin onto a recording medium after the image formation, and is performed by a post-treatment unit.

<<Post-Treatment Liquid>>

The post-treatment liquid contains a water-dispersible resin, and water, preferably further contains a water-soluble organic solvent, a penetrating agent, and a surfactant, and may further contain other components according to the necessity.

Examples of the water-dispersible resin include an acrylic resin, a styrene-acryl resin, a urethane resin, an acryl-silicone resin, and a fluororesin. These may be used alone, or in combination.

As for the water-soluble organic solvent, the penetrating agent, and the surfactant, those identical to the ones for the ink can be used.

Examples of the aforementioned other components include a pH regulator, an antiseptic-antifungal agent, a chelating agent, an anti-rust agent, an antioxidant, an ultraviolet absorber, an oxygen absorber, and a photostabilizer.

The post-treatment liquid may be applied on an entire image surface on the recording medium, or only on a certain area in the image surface on the recording medium. The application method of the post-treatment liquid is not particularly limited, and any of various methods thereof can be selected depending on a type of the post-treatment liquid for use. However, the same method to the coating method of the pre-treatment liquid, or a method for jetting the ink is suitable. Among them, particularly preferred is the same method to the method for jetting the ink in view of a structure of a device, and storage stability of the post-treatment liquid.

A deposition amount of the post-treatment liquid on dry basis is preferably 0.5 g/m$^2$ to 10 g/m$^2$, more preferably 2 g/m$^2$ to 8 g/m$^2$. When the deposition amount thereof is less than 0.5 g/m$^2$, an improvement of an image quality (image density, chroma, glossiness, and fixing ability) is hardly seen. When the deposition amount thereof is greater than 10 g/m$^2$, drying properties of a protective layer are lowered, and also cost efficiency is low, as an effect of improving an image quality is saturated.

<Other Steps and Other Units>

In the present invention, a step containing drying a recording medium to which a post-treatment liquid has been deposited by heating may be optionally provided. The drying by heating can be performed by means of infrared drying equipment, microwave drying equipment, a roll heater, a drum heater, or hot blast.

Moreover, a fixing step containing heating to the range of 100° C. to 150° C. by a heating unit to perform heat-fixing may be in order to level a surface of the image formed, and fix the image. As a result of the fixing step, glossiness and fixing properties of an image recorded product are improved. As for the heat-fixing unit, for example, a roller heater or drum heater having a heated mirror surface is suitably used. The mirror surface part (smooth part) of the roller heater or drum heater can be brought into contact with a surface of the image formed. The heating temperature is preferably equal to or higher than a softening temperature of a thermoplastic resin used in the protective layer. In view of an image quality, safety, and cost efficiency, use of the fixing roller heated to the range of 100° C. to 150° C. is preferable.

Examples of the image forming method of the present invention are illustrated in FIGS. 1 to 6.

FIG. 1 is a schematic diagram illustrating an entire structure of the image forming method, and illustrates an embodiment where heat-fixing is performed with a heat roller during image formation. In FIG. 1, 1 is a recording medium, 2 is ejection of an ink by an inkjet head, 3 is a heat roller, 4 is an image formation area, 5 is a convey belt, and 6 is drying by a drying unit (not illustrated).

Figure 2:
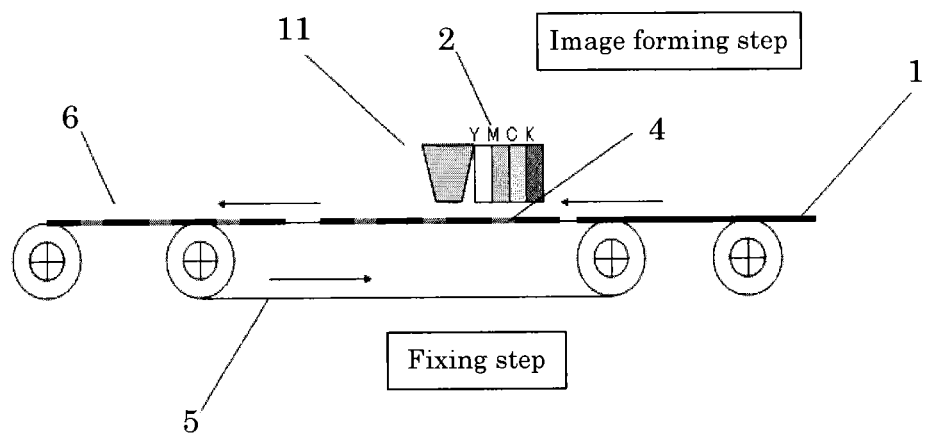
FIG. 2 is a schematic diagram illustrating one example of an entire structure of the image forming method of the present invention, and illustrates an embodiment where heat-fixing is performed just after image formation.

FIG. 2 is a schematic diagram illustrating an entire structure of the image forming method, and illustrates an embodiment where heat-fixing I performed with hot blast just after image formation. In FIG. 2, 1 is a recording medium, 2 is ejection of an ink by an inkjet head, 4 is an image formation area, 5 is a convey belt, 6 is drying by a drying unit (not illustrated, and 11 is hot blast.

Figure 3:
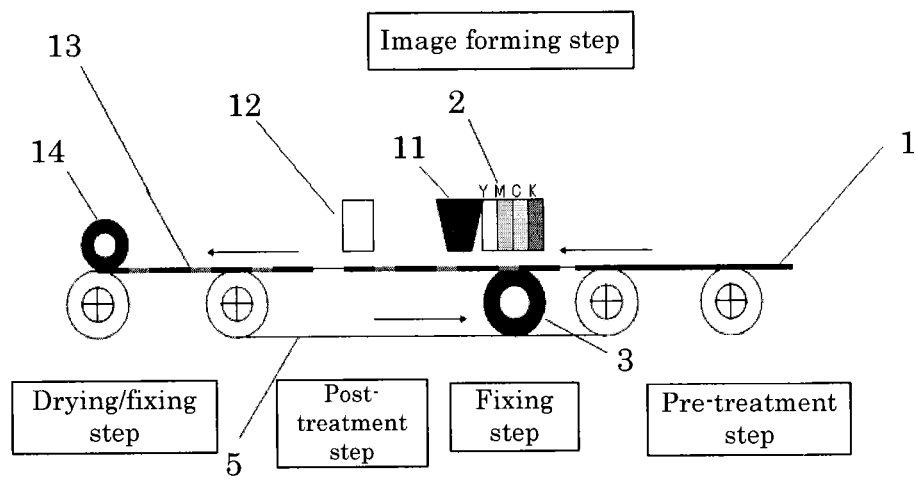
FIG. 3 is a schematic diagram illustrating one example of an entire structure of the image forming method of the present invention, and illustrates an embodiment where a post-treatment and heat-fixing are performed after image formation and heat-fixing.

FIG. 3 is a schematic diagram illustrating an entire structure of the image forming method, and illustrating an embodiment where a post-treatment and heat-fixing are performed after heat-fixing for image formation. In FIG. 3, 1 is a recording medium, 2 is ejection of an ink by an inkjet head, 3 is a heat roller, 5 is a convey belt, 11 is hot blast, 12 is ejection of a post-treatment liquid, 13 is a post-treatment to the image formation area, and 14 is a fixing roller.

Figure 4:
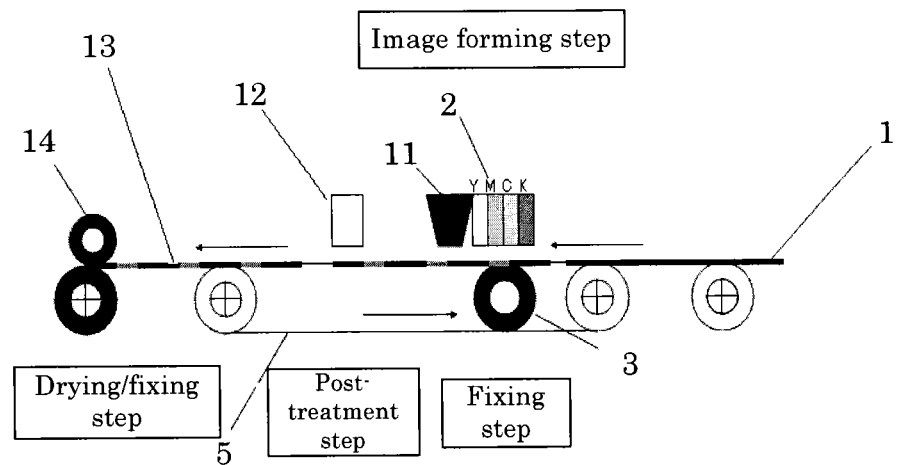
FIG. 4 is a schematic diagram illustrating one example of an entire structure of the image forming method of the present invention, and illustrates an embodiment where a post-treatment and heat-roller drying are performed after image formation and heat-fixing.

FIG. 4 is a schematic diagram illustrating an entire structure of the image forming method, and illustrates an embodiment where a post-treatment and heat roller drying are performed after heat-fixing for image formation. In FIG. 4, 1 is a recording medium, 2 is ejection of an ink by an inkjet head, 3 is a heat roller, 5 is a convey belt, 11 is hot blast, 12 is ejection of a post-treatment liquid, 13 is a post-treatment to the image formation area, and 14 is a fixing roller.

Figure 5:
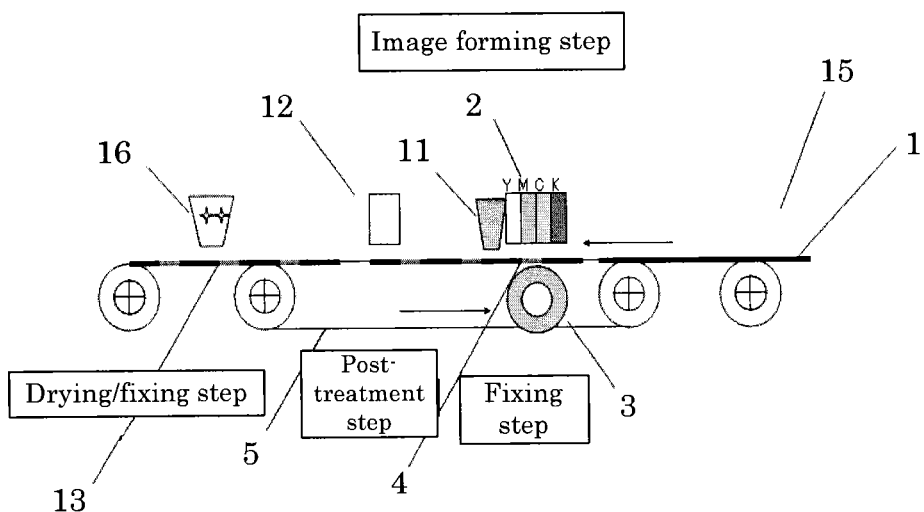
FIG. 5 is a schematic diagram illustrating one example of an entire structure of the image forming method of the present invention, and illustrates an embodiment where a post-treatment and IR ray radiation dying are performed after image formation and heat-fixing.

FIG. 5 is a schematic diagram illustrating an entire structure of the image forming method, and illustrates an embodiment where a post-treatment and IR ray radiation drying are performed after heat-fixing for image formation. In FIG. 5, 1 is a recording medium, 2 is ejection of an ink by an inkjet head, 3 is a heat roller, 4 is an image formation area, 5 is a convey belt, 11 is hot blast, 12 is ejection of a post-treatment liquid, 13 is a post-treatment to the image formation area, 15 is coating of a pre-treatment liquid, and 16 is IR ray radiation.

Figure 6:
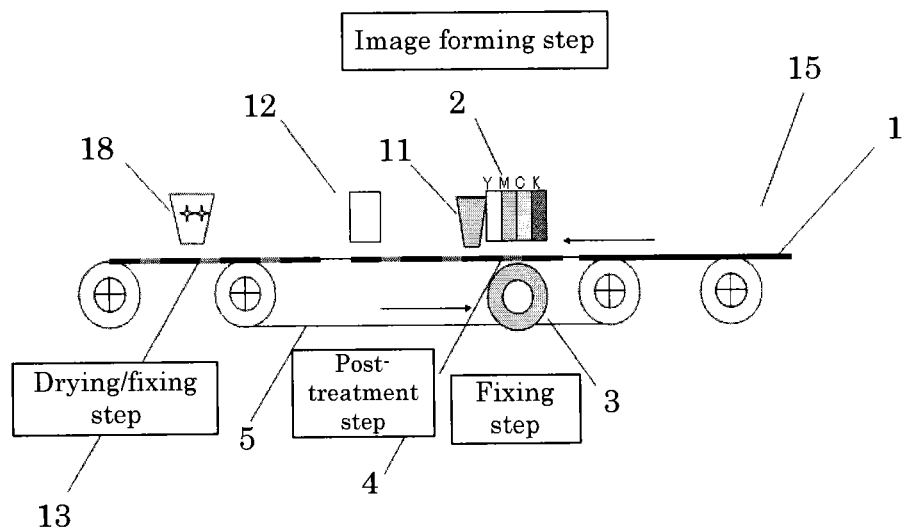
FIG. 6 is a schematic diagram illustrating one example of an entire structure of the image forming method of the present invention, and illustrates an embodiment where a post-treatment and microwave drying are performed after image formation and heat-fixing.

FIG. 6 is a schematic diagram illustrating an entire structure of the image forming method, and illustrates an embodiment where a post-treatment and microwave drying are performed after heat-fixing for image formation. In FIG. 6, 1 is a recording medium, 2 is ejection of an ink by an inkjet head, 3 is a heat roller, 4 is an image formation area, 5 is a convey belt, 11 is hot blast, 12 is ejection of a post-treatment liquid, 13 is a post-treatment to the image formation area, 15 is coating of a pre-treatment liquid, and 18 is microwaves.

EXAMPLES

The present invention is more specifically explained through Examples and Comparative Examples hereinafter, but Examples shall not be construed to as limit the scope of the present invention in any way.

Preparation Example 1

Preparation of Water-Soluble Polymer Compound Aqueous Solution A

A materials of the composition constituted of the following (1) to (3) were heated and stirred by a stirrer to dissolve the copolymer of (1), and a trace of insoluble matter was separated through filtration using a filter having the average pore diameter of 5 μM, to thereby prepare Water-Soluble Polymer Compound Aqueous Solution A.
<Composition>
(1) 10.0 parts by weight of α-olefin-maleic anhydride copolymer represented by the following general formula (I) (T-YP112, manufactured by SEIKO PMC CORPORATION, R: C18-C22 alkyl group, n: an integer of 30 to 100, acid value: 190 mgKOH/g, the weight average molecular weight: 100,000)

Note that, the copolymer of (1) was synthesized using C20-C24 olefin, and the obtained copolymer was a copolymer, in which alkyl groups (R), in each of which the number of carbon atoms excluding 2 carbon atoms constituting a double bond was 18 to 22, were randomly introduced in a polymer chain.

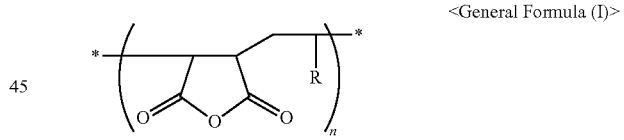

<General Formula (I)>

(2) 17.34 parts by mass [an amount that was 1.2 times the acid value of the copolymer of (1)] of IN LiOH aqueous solution
(3) 72.66 parts by mass of ion-exchanged water
<Measurement of Average Molecular Weight>

The weight average molecular weight of the copolymer of (1) was measured in the following manner by means of a gel permeation chromatography (GPC) system.

First, the copolymer was dissolved in tetrahydrofuran (THF).

Subsequently, three types of polystyrene (molecular weights: 1,000, 2,400, 8,500) the molecular weight of which had been known, were measured as a molecular weight standard material using KF-806L (for THF) as a GPC column, to prepare a calibration curve.

Subsequently, the copolymer of (1) was subjected to the GPC measurement. Based on the obtained graph reflecting a size-exclusion (SEC) chromatogram, a differential molecular weight distribution curve, and a calibration curve obtained from the molecular weight standard materials, the weight average molecular weight was calculated.

Preparation Example 2

Preparation of Surface Modified Black Pigment Dispersion

To 3,000 mL of 2.5N sodium sulfate aqueous solution, 90 g of carbon black (CTAB specific surface area: 150 $m^2/g$, DBP oil absorption: 100 mL/100 g), and the resultant was allowed to react for 10 hours with stirring at the speed of 300 rpm at the temperature of 60° C., to thereby perform an oxidation treatment. The reaction liquid was filtered, and the separated carbon black was neutralized with a sodium hydroxide aqueous solution, followed by ultrafiltration.

The obtained carbon black was washed with water, dried, and then dispersed in pure water to give a solid content of 30% by mass. Thereafter, the resultant was sufficiently stirred to thereby obtain a black pigment dispersion liquid.

The volume average particle diameter of the pigment dispersion elements in the obtained black pigment dispersion liquid was measured by means of a particle size distribution measuring device (NANOTRACK UPA-EX150, manufactured by Nikkiso Co., Ltd.). The volume average particle diameter thereof was 103 nm.

Preparation Example 3

Preparation of Magenta Pigment-Containing Polymer Particle Dispersion Liquid

—Preparation of Polymer Solution A—

After sufficiently purging a 1 L flask equipped with a mechanical stirrer, a thermometer, a nitrogen inlet tube, a reflux tube, and a dripping funnel with nitrogen gas, the flask was charged with 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol, and the mixture was mixed and heated to 65° C. Next, a mixed solution of styrene (100.8 g), acrylic acid (25.2 g), lauryl methacrylate (108.0 g), polyethylene glycol methacrylate (36.0 g), hydroxyethyl methacrylate (60.0 g), styrene macromer (36.0 g), mercapto ethanol (3.6 g), azobis methylvaleronitrile (2.4 g), and methyl ethyl ketone (18.0 g) was added dropwise into the flask over 2.5 hours. After the dripping, a mixed solution of azobis methylvaleronitrile (0.8 g) and methyl ethyl ketone (18.0 g) was added dropwise into the flask over 0.5 hours. After aging the mixture at 65° C. for 1 hour, 0.8 g of azobis methylvaleronitrile was added, and the resultant was further aged for 1 hour. Upon completion of the reaction, methyl ethyl ketone (364.0 g) was added to the flask, to thereby obtain 800 g of Polymer Solution A having a concentration of 50% by mass.

—Preparation of Magenta Pigment-Containing Polymer Particle Dispersion Liquid—

After sufficiently stirring a mixture of Polymer Solution A (28 g), C.I. Pigment Red 122 (42 g) serving as a pigment, a 1 mol/L potassium hydroxide aqueous solution (13.6 g), methyl ethyl ketone (20.0 g), and ion-exchanged water (13.6 g), the resulting mixture was kneaded by a roll mill. To 200 g of pure water, the obtained paste was added. After sufficiently stirring the resulting mixture, methyl ethyl ketone and water were removed using an evaporator, followed by subjecting the resultant to pressure filtration with a polyvinylidene fluoride membrane filter having the average pore diameter of 5.0 μm to remove coarse particles, to thereby obtain a magenta pigment-containing polymer particle dispersion liquid having a pigment concentration of 15% by mass, and solid content of 20% by mass.

The volume average particle diameter of the polymer particles in the obtained dispersion liquid was measured in the same manner as in Preparation Example 2, and the volume average particle diameter thereof was 127 nm.

Preparation Example 4

Preparation of Cyan Pigment-Containing Polymer Particle Dispersion Liquid

A cyan pigment-containing polymer particle dispersion liquid was obtained in the same manner as in Preparation Example 3, provided that the pigment for use was changed to a phthalocyanine pigment (C.I. Pigment Blue 15:3). The volume average particle diameter of the polymer particles in the obtained dispersion liquid was measured in the same manner as in Preparation Example 2, and the volume average particle diameter thereof was 93 nm.

Preparation Example 5

Preparation of Yellow Pigment-Containing Polymer Particle Dispersion Liquid

A yellow pigment-containing polymer particle dispersion liquid was obtained in the same manner as in Preparation Example 3, provided that the pigment for use was changed to a monoazo yellow pigment (C.I. Pigment Yellow 74). The volume average particle diameter of the polymer particles in the obtained dispersion liquid was measured in the same manner as in Preparation Example 2, and the volume average particle diameter thereof was 76 nm.

Preparation Example 6

Preparation of Carbon Black Pigment-Containing Polymer Particle Dispersion Liquid A carbon black pigment-containing polymer particle dispersion liquid was obtained in the same manner as in Preparation Example 3, provided that the pigment for use was changed to carbon black (FW100, manufactured by Degussa AG). The volume average particle diameter of the polymer particles in the obtained dispersion liquid was measured in the same manner as in Preparation Example 2, and the volume average particle diameter thereof was 104 nm.

Preparation Example 7

Preparation of Yellow Pigment Surfactant Dispersion Liquid (1) 30.0 parts by mass of a monoazo yellow pigment (C.I. Pigment Yellow 74, manufactured by Dainichiseika Color & Chemicals Mfg. Co., Ltd.)
(2) 10.0 parts by mass of polyoxyethylene styrene phenyl ether (nonionic surfactant, NOIGEN EA-177 manufactured by Dai-ichi Kogyo Seiyaku Co., Ltd., HLB value: 15.7)
(3) 60.0 parts by mass of ion-exchanged water The surfactant (2) was dissolved in the ion-exchanged water (3), and to this the pigment (1) was mixed to sufficiently wet the pigment (1). The resulting mixture was dispersed for 2 hours at 2,000 rpm by means of a wet disperser (DYNO-MILL KDL A, manufactured by WAB) filled with zirconia beads having diameters of 0.5 mm, to thereby obtain a primary pigment dispersion. Subsequently, 4.26 parts by mass of a water-soluble urethane resin (TAKE-LAC W-5661, manufactured by Mitsui Chemicals, Inc., active ingredient: 35.2% by mass, acid value: 40 mgKOH/g, molecular weight: 18,000) was added, as a water-soluble polymer compound aqueous solution, to the primary pigment dispersion, and the resultant was sufficiently stirred to thereby obtain a yellow pigment surfactant dispersion liquid. The volume average particle diameter of the pigment dispersion elements in the obtained dispersion liquid was measured in the same manner as in Preparation Example 2, and the volume average particle diameter thereof was 62 nm.

Preparation Example 8

Preparation of Magenta Pigment Surfactant Dispersion Liquid (1) 30.0 parts by mass of a quinacridon pigment (C.I. Pigment Red 122, manufactured by Dainichiseika Color & Chemicals Mfg. Co., Ltd.)
(2) 10.0 parts by mass of polyoxyethylene-β-naphthyl ether (nonionic surfactant, RT-100, manufactured by Takemoto Oil & Fat Co., Ltd., HLB value: 18.5)
(3) 60.0 parts by mass of ion-exchanged water The surfactant (2) was dissolved in the ion-exchanged water (3), and to this the pigment (1) was mixed to sufficiently wet the pigment (1). The resulting mixture was dispersed for 2 hours at 2,000 rpm by means of a wet disperser (DYNO-MILL KDL A, manufactured by WAB) filled with zirconia beads having diameters of 0.5 mm, to thereby obtain a primary pigment dispersion. Subsequently, 7.14 parts by mass of water-soluble styrene-(meth)acryl copolymer (JC-05, manufactured by SEIKO PMC CORPORATION, active ingredient: 21% by mass, acid value: 170 mgKOH/g, the weight average molecular weight: 16,000) was added to the primary pigment dispersion, and the resultant was sufficiently stirred to thereby obtain a magenta pigment surfactant dispersion liquid. The volume average particle diameter of the pigment dispersion elements in the obtained dispersion liquid was measured in the same manner as in Preparation Example 2, and the volume average particle diameter thereof was 83 nm.

Preparation Example 9

Preparation of Cyan Pigment Surfactant Dispersion Liquid (1) 30.0 parts by mass of a phthalocyanine pigment (C.I. Pigment Blue 15:3, manufactured by Dainichiseika Color & Chemicals Mfg. Co., Ltd.)
(2) 10.0 parts by mass of polyoxyethylene styrene phenyl ether (nonionic surfactant, NOIGEN EA-177 manufactured by Dai-ichi Kogyo Seiyaku Co., Ltd., HLB value: 15.7)
(3) 60.0 parts by mass of ion-exchanged water The surfactant (2) was dissolved in the ion-exchanged water (3), and to this the pigment (1) was mixed to sufficiently wet the pigment (1). The resulting mixture was dispersed for 2 hours at 2,000 rpm by means of a wet disperser (DYNO-MILL KDL A, manufactured by WAB) filled with zirconia beads having diameters of 0.5 mm, to thereby obtain a primary pigment dispersion. Subsequently, 7.51 parts by mass of the water-soluble polymer compound aqueous solution A prepared in Preparation Example 1, and 2.51 parts by mass of a water-soluble polyester resin (NICHIGO POLYESTER W-0030, manufactured by Nippon Synthetic Chemical Industry Co., Ltd., active ingredient: 29.9% by mass, acid value: 100 mgKOH/g, the weight average molecular weight: 7,000) were added to the primary pigment dispersion, and the resultant was sufficiently stirred to thereby obtain a cyan pigment surfactant dispersion liquid. The volume average particle diameter of the pigment dispersion elements in the obtained dispersion liquid was measured in the same manner as in Preparation Example 2, and the volume average particle diameter thereof was 78 nm.

Production Examples 1 to 24

Production of Inkjet Ink

First, as depicted in the following Tables 1 to 5, water-soluble organic solvents [the compound represented by the structural formula (I), alkyl alkane diol, polyhydric alcohol], a penetrating agent, a surfactant, and an antifungal agent, and water were blended, and the resultant was homogeneously mixed by stirring for 1 hour. Depending on the mixed liquid, moreover, a water-dispersible resin was added, followed by stirring for 1 hour, and then a pigment dispersion liquid, a defoaming agent, and a pH regulator were added, followed by stirring for 1 hour. The resulting dispersion liquid was subjected to pressure filtration with a polyvinylidene fluoride membrane filter having the average pore diameter of 5.0 μm to remove coarse particles and dust, to thereby produce an inkjet ink of each of Production Examples 1 to 24.

TABLE 1

| Ingredient (mass %) | | Production Ex. 1 | Production Ex. 2 | Production Ex. 3 | Production Ex. 4 | Production Ex. 5 | Production Ex. 6 |
|---|---|---|---|---|---|---|---|
| Pigment dispersion liquid | Surface-treated black pigment dispersion liquid (Prep. Ex. 2) | 26.67 | — | — | — | 16.67 | — |
| | Magenta pigment-containing polymer particle dispersion liquid (Prep. Ex. 3) | — | — | — | — | — | — |
| | Cyan pigment-containing polymer particle dispersion liquid (Prep. Ex. 4) | — | — | — | — | — | — |

TABLE 1-continued

| Ingredient (mass %) | | Production Ex. 1 | Production Ex. 2 | Production Ex. 3 | Production Ex. 4 | Production Ex. 5 | Production Ex. 6 |
|---|---|---|---|---|---|---|---|
| | Yellow pigment-containing polymer particle dispersion liquid (Prep. Ex. 5) | — | — | — | — | — | — |
| | Black pigment-containing polymer particle dispersion liquid (Prep. Ex. 6) | | | | | | |
| | Yellow pigment surfactant dispersion liquid (Prep. Ex. 7) | — | 15.64 | — | — | — | 10.43 |
| | Magenta pigment surfactant dispersion liquid (Prep. Ex. 8) | — | — | 26.79 | — | — | — |
| | Cyan pigment surfactant dispersion liquid (Prep. Ex. 9) | — | — | — | 16.50 | — | — |
| Water-dispersible resin | Acryl-silicone resin emulsion | — | — | — | — | 26.88 | 32.26 |
| | Acryl-styrene resin emulsion | — | — | — | — | — | — |
| | Polyurethane emulsion | — | — | — | — | — | — |
| Water-soluble organic solvent | Compound of structural formula (I) | 12.50 | 15.00 | 12.50 | 15.00 | 10.00 | 12.50 |
| | 3-methyl-1,3-butanediol | 20.00 | — | — | — | 15.00 | — |
| | Glycerin | 10.00 | 10.00 | 10.00 | 10.00 | 7.50 | 10.00 |
| | 1,3-butanediol | — | 25.00 | 20.00 | 25.00 | — | 15.00 |
| Penetrating agent | 2-ethyl-1,3-hexanediol | 2.00 | 2.00 | 2.00 | 2.00 | 2.00 | 2.00 |
| | 2,2,4-trimethyl-1,3-pentanediol | — | — | — | — | — | — |
| Surfactant | KF-643 | 0.75 | 1.00 | 1.00 | 1.00 | 1.00 | 1.00 |
| | Zonyl FS-300 | — | — | — | — | — | — |
| | Softanol EP-7025 | — | — | — | — | — | — |
| Antifungal agent | Proxel GXL | 0.05 | 0.05 | 0.05 | 0.05 | 0.05 | 0.05 |
| Defoaming agent | Silicone defoaming agent KM-72F | 0.10 | 0.10 | 0.10 | 0.10 | 0.10 | 0.10 |
| pH regulator | 2-amino-2-ethyl-1,3-propanediol | 0.3 | 0.3 | 0.3 | 0.3 | 0.3 | 0.3 |
| Pure water | | Balance | Balance | Balance | Balance | Balance | Balance |
| Total (mass %) | | 100 | 100 | 100 | 100 | 100 | 100 |

TABLE 2

| Ingredient (mass %) | | Production Ex. 7 | Production Ex. 8 | Production Ex. 9 | Production Ex. 10 | Production Ex. 11 | Production Ex. 12 |
|---|---|---|---|---|---|---|---|
| Pigment dispersion liquid | Surface-treated black pigment dispersion liquid (Prep. Ex. 2) | — | — | — | — | — | — |
| | Magenta pigment-containing polymer particle dispersion liquid (Prep. Ex. 3) | — | — | — | — | — | 50.00 |
| | Cyan pigment-containing polymer particle dispersion liquid (Prep. Ex. 4) | — | — | — | 30.00 | — | — |
| | Yellow pigment-containing polymer particle dispersion liquid (Prep. Ex. 5) | — | — | — | — | 30.00 | — |
| | Black pigment-containing polymer particle dispersion liquid (Prep. Ex. 6) | — | — | 50.00 | — | — | — |

TABLE 2-continued

| Ingredient (mass %) | | Production Ex. 7 | Production Ex. 8 | Production Ex. 9 | Production Ex. 10 | Production Ex. 11 | Production Ex. 12 |
|---|---|---|---|---|---|---|---|
| | Yellow pigment surfactant dispersion liquid (Prep. Ex. 7) | — | — | — | — | — | — |
| | Magenta pigment surfactant dispersion liquid (Prep. Ex. 8) | 17.86 | — | — | — | — | — |
| | Cyan pigment surfactant dispersion liquid (Prep. Ex. 9) | — | 11.00 | — | — | — | — |
| Water-dispersible resin | Acryl-silicone resin emulsion | 26.88 | 32.26 | — | — | — | — |
| | Acryl-styrene resin emulsion | — | — | — | — | — | — |
| | Polyurethane emulsion | — | — | — | — | — | — |
| Water-soluble organic solvent | Compound of structural formula (I) | 10.00 | 12.50 | 12.50 | 15.00 | 15.00 | 12.50 |
| | 3-methyl-1,3-butanediol | — | — | 12.50 | — | — | — |
| | Glycerin | 7.50 | 10.00 | 10.00 | 10.00 | 10.00 | 10.00 |
| | 1,3-butanediol | 15.50 | 14.00 | — | 17.50 | 17.50 | 15.00 |
| Penetrating agent | 2-ethyl-1,3-hexanediol | 2.00 | 2.00 | — | 2.00 | 2.00 | 2.00 |
| | 2,2,4-trimethyl-1,3-pentanediol | — | — | 2.00 | — | — | — |
| Surfactant | KF-643 | 1.00 | 1.00 | — | — | — | — |
| | Zonyl FS-300 | — | — | 1.25 | 2.50 | 2.50 | 2.50 |
| | Softanol EP-7025 | — | — | — | — | — | — |
| Antifungal agent | Proxel GXL | 0.05 | 0.05 | 0.05 | 0.05 | 0.05 | 0.05 |
| Defoaming agent | Silicone defoaming agent KM-72F | 0.10 | 0.10 | 0.10 | 0.10 | 0.10 | 0.10 |
| pH regulator | 2-amino-2-ethyl-1,3-propanediol | 0.3 | 0.3 | 0.3 | 0.3 | 0.3 | 0.3 |
| Pure water | | Balance | Balance | Balance | Balance | Balance | Balance |
| Total (mass %) | | 100 | 100 | 100 | 100 | 100 | 100 |

TABLE 3

| Ingredient (mass %) | | Production Ex. 13 | Production Ex. 14 | Production Ex. 15 | Production Ex. 16 |
|---|---|---|---|---|---|
| Pigment dispersion liquid | Surface-treated black pigment dispersion liquid (Prep. Ex. 2) | 16.67 | — | — | — |
| | Magenta pigment-containing polymer particle dispersion liquid (Prep. Ex. 3) | — | — | — | — |
| | Cyan pigment-containing polymer particle dispersion liquid (Prep. Ex. 4) | — | — | — | — |
| | Yellow pigment-containing polymer particle dispersion liquid (Prep. Ex. 5) | — | — | — | — |
| | Black pigment-containing polymer particle dispersion liquid (Prep. Ex. 6) | — | — | — | — |
| | Yellow pigment surfactant dispersion liquid (Prep. Ex. 7) | — | 10.43 | — | — |
| | Magenta pigment surfactant dispersion liquid (Prep. Ex. 8) | — | — | 17.86 | — |
| | Cyan pigment surfactant dispersion liquid (Prep. Ex. 9) | — | — | — | 11.00 |
| Water-dispersible resin | Acryl-silicone resin emulsion | — | — | — | — |
| | Acryl-styrene resin emulsion | 17.78 | — | — | — |
| | Polyurethane emulsion | — | 24.39 | 21.95 | 24.39 |
| Water-soluble organic solvent | Compound of structural formula (I) | 10.00 | 12.50 | 10.00 | 12.50 |
| | 3-methyl-1,3-butanediol | 15.00 | — | — | — |
| | Glycerin | 7.50 | 10.00 | 7.50 | 10.00 |
| | 1,3-butanediol | — | 15.00 | 15.00 | 15.00 |
| Penetrating agent | 2-ethyl-1,3-hexanediol | 2.00 | 2.00 | 2.00 | 2.00 |
| | 2,2,4-trimethyl-1,3-pentanediol | — | — | — | — |

TABLE 3-continued

|  | Ingredient (mass %) | Production Ex. 13 | Production Ex. 14 | Production Ex. 15 | Production Ex. 16 |
| --- | --- | --- | --- | --- | --- |
| Surfactant | KF-643 | — | — | — | — |
|  | Zonyl FS-300 | — | — | — | — |
|  | Softanol EP-7025 | 0.75 | 1.00 | 1.00 | 1.00 |
| Antifungal agent | Proxel GXL | 0.05 | 0.05 | 0.05 | 0.05 |
| Defoaming agent | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
|  | Pure water | Balance | Balance | Balance | Balance |
|  | Total (mass %) | 100 | 100 | 100 | 100 |

TABLE 4

|  | Ingredient (mass %) | Production Ex. 17 | Production Ex. 18 | Production Ex. 19 | Production Ex. 20 | Production Ex. 21 | Production Ex. 22 |
| --- | --- | --- | --- | --- | --- | --- | --- |
| Pigment dispersion liquid | Surface-treated black pigment dispersion liquid (Prep. Ex. 2) | 16.67 | — | — | — | — | — |
|  | Magenta pigment-containing polymer particle dispersion liquid (Prep. Ex. 3) | — | — | — | — | — | — |
|  | Cyan pigment-containing polymer particle dispersion liquid (Prep. Ex. 4) | — | — | — | — | — | 30.00 |
|  | Yellow pigment-containing polymer particle dispersion liquid (Prep. Ex. 5) | — | — | — | — | — | — |
|  | Black pigment-containing polymer particle dispersion liquid (Prep. Ex. 6) | — | — | — | — | 50.00 | — |
|  | Yellow pigment surfactant dispersion liquid (Prep. Ex. 7) | — | 10.43 | — | — | — | — |
|  | Magenta pigment surfactant dispersion liquid (Prep. Ex. 8) | — | — | 17.86 | — | — | — |
|  | Cyan pigment surfactant dispersion liquid (Prep. Ex. 9) | — | — | — | 11.00 | — | — |
| Water dispersible resin | Acryl-silicone resin emulsion | 26.88 | 32.26 | 26.88 | 32.26 | — | — |
|  | Acryl-styrene resin emulsion | — | — | — | — | — | — |
|  | Polyurethane emulsion | — | — | — | — | — | — |
| Water soluble organic solvent | Compound of structural formula (I) | — | — | — | — | — | — |
|  | 3-methyl-1,3-butanediol | 22.50 | — | — | — | 22.00 | — |
|  | Glycerin | 7.50 | 10.00 | 7.50 | 10.00 | 10.00 | 10.00 |
|  | 1,3-butanediol | — | 27.50 | 25.00 | 27.50 | — | 30.00 |
| Penetrating agent | 2-ethyl-1,3-hexanediol | 2.00 | 2.00 | 2.00 | 2.00 | — | 2.00 |
|  | 2,2,4-trimethyl-1,3-pentanediol | — | — | — | — | 2.00 | — |
| Surfactant | KF-643 | 1.00 | 1.00 | 1.00 | 1.00 | — | — |
|  | Zonyl FS-300 | — | — | — | — | 1.25 | 2.50 |
|  | Softanol EP-7025 | — | — | — | — | — | — |
| Antifungal agent | Proxel GXL | 0.05 | 0.05 | 0.05 | 0.05 | 0.05 | 0.05 |

TABLE 4-continued

| Ingredient (mass %) | | Production Ex. 17 | Production Ex. 18 | Production Ex. 19 | Production Ex. 20 | Production Ex. 21 | Production Ex. 22 |
|---|---|---|---|---|---|---|---|
| Defoaming agent | Silicone defoaming agent KM-72F | 0.10 | 0.10 | 0.10 | 0.10 | 0.10 | 0.10 |
| pH regulator | 2-amino-2-ethyl-1,3-propanediol | 0.3 | 0.3 | 0.3 | 0.3 | 0.3 | 0.3 |
| Pure water | | Balance | Balance | Balance | Balance | Balance | Balance |
| Total (mass %) | | 100 | 100 | 100 | 100 | 100 | 100 |

TABLE 5

| Ingredient (mass %) | | Production Ex. 23 | Production Ex. 24 |
|---|---|---|---|
| Pigment dispersion liquid | Surface-treated black pigment dispersion liquid (Prep. Ex. 2) | — | — |
| | Magenta pigment-containing polymer particle dispersion liquid (Prep. Ex. 3) | — | 50.00 |
| | Cyan pigment-containing polymer particle dispersion liquid (Prep. Ex. 4) | — | — |
| | Yellow pigment-containing polymer particle dispersion liquid (Prep. Ex. 5) | 30.00 | — |
| | Black pigment-containing polymer particle dispersion liquid (Prep. Ex. 6) | — | — |
| | Yellow pigment surfactant dispersion liquid (Prep. Ex. 7) | — | — |
| | Magenta pigment surfactant dispersion liquid (Prep. Ex. 8) | — | — |
| | Cyan pigment surfactant dispersion liquid (Prep. Ex. 9) | — | — |
| Water-dispersible resin | Acryl-silicone resin emulsion | — | — |
| | Acryl-styrene resin emulsion | — | — |
| | Polyurethane emulsion | — | — |
| Water-soluble organic solvent | Compound of structural formula (I) | — | — |
| | 3-methyl-1,3-butanediol | — | — |
| | Glycerin | 10.00 | 10.00 |
| | 1,3-butanediol | 30.00 | 25.00 |
| Penetrating agent | 2-ethyl-1,3-hexanediol | 2.00 | 2.00 |
| | 2,2,4-trimethyl-1,3-pentanediol | — | — |
| Surfactant | KF-643 | — | — |
| | Zonyl FS-300 | 2.50 | 2.50 |
| | Softanol EP-7025 | — | — |
| Antifungal agent | Proxel GXL | 0.05 | 0.05 |
| Defoaming agent | Silicone defoaming agent KM-72F | 0.10 | 0.10 |
| pH regulator | 2-amino-2-ethyl-1,3-propanediol | 0.3 | 0.3 |
| | Pure water | Balance | Balance |
| Total (mass %) | | 100 | 100 |

The abbreviations in Tables 1 to 5 are as follows:

—Water-Dispersible Resin—

*Acryl-silicone resin emulsion: Chaline FE-230N, manufactured by Nissin Chemical Co., Ltd., solid content: 30% by mass

*Styrene-acryl resin emulsion: Vinyblan 2586, manufactured by Nissin Chemical Co., Ltd., solid content: 45% by mass, the minimum film forming temperature (MFT): 0° C. or lower

*Polyurethane emulsion: HYDRAN APX-101H, manufactured by DIC CORPORATION, solid content: 45% by mass, the average particle diameter: 160 nm, the minimum film forming temperature (MFT): 20° C.

—Water-Soluble Organic Solvent—

*Compound represented by the structural formula (I)

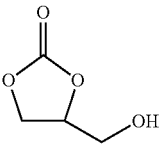

—Surfactant—

*KF-643: polyether-modified silicone compound (manufactured by Shin-Etsu Chemical Co., Ltd., ingredient: 100% by mass)

*Zonyl FS-300: polyoxyethylene perfluoroalkyl ether (manufactured by Du Pont Kabushiki Kaisha, ingredient: 40% by mass)

*Softanol EP-7025: polyoxyalkylene alkyl ether (manufactured by NIPPON SHOKUBAI CO., LTD., ingredient: 100% by mass)

—Antifungal Agent—

*Proxel GXL: antifungal agent containing 1,2-benzothiazolin-3-one as a main component (manufactured by Avecia Inc., ingredient: 20% by mass, containing dipropylene glycol)

—Defoaming Agent—

*KM-72F: self-emulsifying silicone defoaming agent (manufactured by Shin-Etsu Chemical Co., Ltd., ingredient: 100% by mass)

Next, the physical properties of each of the inks of Production Examples 1 to 24 were measured in the following manners. The results are presented in Table 6.

<Viscosity>

The viscosity of the ink was measured at 25° C. by means of a viscometer (RE-550L, manufactured by Toki Sangyo Co., Ltd.).

<pH>

The pH of the ink was measured at 25° C. using a pH meter (HM-30R, manufactured by TOA-DKK CORPORATION).

<Static Surface Tension>

The static surface tension of the ink was measured at 25° C. by means of an automatic surface tensiometer (CBVP-Z, manufactured by Kyowa Interface Science Co., Ltd.).

TABLE 6

| | Physical property values of ink | | |
|---|---|---|---|
| | Viscosity (mPa·s) | pH | Surface tension (mN/m) |
| Production Example 1 | 8.22 | 9.4 | 23.7 |
| Production Example 2 | 7.95 | 9.4 | 22.8 |
| Production Example 3 | 8.18 | 9.7 | 22.4 |
| Production Example 4 | 8.05 | 9.6 | 22.1 |
| Production Example 5 | 7.99 | 9.8 | 24.4 |
| Production Example 6 | 8.10 | 9.7 | 23.3 |
| Production Example 7 | 7.87 | 9.5 | 23.4 |
| Production Example 8 | 8.05 | 9.4 | 23.1 |
| Production Example 9 | 8.23 | 9.7 | 25.6 |
| Production Example 10 | 8.12 | 9.7 | 24.3 |
| Production Example 11 | 8.11 | 9.7 | 24.4 |
| Production Example 12 | 8.25 | 9.4 | 24.2 |
| Production Example 13 | 7.78 | 9.8 | 31.9 |
| Production Example 14 | 7.76 | 9.2 | 30.7 |
| Production Example 15 | 7.85 | 9.3 | 30.9 |
| Production Example 16 | 7.98 | 9.5 | 30.2 |
| Production Example 17 | 8.56 | 9.2 | 24.8 |
| Production Example 18 | 8.43 | 9.5 | 23.8 |
| Production Example 19 | 8.52 | 9.4 | 23.9 |
| Production Example 20 | 8.60 | 9.6 | 23.6 |
| Production Example 21 | 8.33 | 9.5 | 25.4 |
| Production Example 22 | 8.16 | 9.3 | 24.3 |
| Production Example 23 | 8.18 | 9.2 | 24.1 |
| Production Example 24 | 8.11 | 9.5 | 23.9 |

Production Examples A1 to A6

Production of Post-Treatment Liquid

First, as depicted in Table 7 below, a water-dispersible resin, a wetting agent(s), a penetrating agent, a surfactant, an antifungal agent, and water were blended, and the resulting mixture was homogeneously mixed by stirring for 1 hour. To the mixture, a defoaming agent, and a pH regulator were added, and the resulting mixture was stirred for 1 hour. The resulting dispersion liquid was subjected to pressure filtration with a polyvinylidene fluoride membrane filter having the average pore diameter of 5.0 μm to remove coarse particles and dusts, to thereby produce a post-treatment liquid of each of Production Examples A1 to A6.

TABLE 7

| | | Production Example | | | | | |
|---|---|---|---|---|---|---|---|
| | Ingredient (mass %) | A1 | A2 | A3 | A4 | A5 | A6 |
| Water-dispersible resin | Lumiflon FE4500 | 38.46 | — | — | — | — | — |
| | Polysol ROY6312 | — | 50.00 | — | — | — | — |
| | HYDRAN HW-930 | — | — | 40.00 | — | — | — |
| | VONCOAT 9455 | — | — | — | 50.00 | — | — |
| | VONCOAT BC-280 | — | — | — | — | 40.00 | — |
| | Vinyblan 2580 | — | — | — | — | — | 44.44 |
| | Vinyblan 2586 | — | — | — | — | — | — |
| Wetting agent | 1,3-butanediol | — | 20.00 | 20.00 | — | 20.00 | — |
| | 3-methyl-1,3-butanediol | 20.00 | — | 5.00 | — | — | 20.00 |
| | Glycerin | 10.00 | 15.00 | 15.00 | — | 15.00 | 10.00 |
| Penetrating agent | 2-ethyl-1,3-hexanediol | 1.00 | 1.00 | 1.00 | — | 1.00 | 1.00 |
| Surfactant | Zonyl FS-300 | — | 1.00 | 1.00 | — | 1.00 | — |
| | Compound of Formula (F-1)-e | 0.25 | — | — | 0.25 | — | 0.25 |
| Antifungal agent | Proxel GXL | 0.05 | 0.05 | 0.05 | 0.05 | 0.05 | 0.05 |
| Defoaming agent | 2,4,7,9-tetramethyldecane-4,7-diol | 0.05 | 0.05 | 0.05 | — | 0.05 | — |
| pH regulator | 2-amino-2-ethyl-1,3-propanediol | — | 0.20 | 0.20 | — | 0.20 | — |
| Pure water | | balance | balance | balance | balance | balance | balance |
| Total (mass %) | | 100 | 100 | 100 | 100 | 100 | 100 |

The abbreviations in Table 7 are as follows. Note that, Zonyl FS-300, KF-643, and Proxel GXL are the same as in Tables 1 to 5.

*Lumiflon FE4500: manufactured by ASAHI GLASS CO., LTD., a fluororesin emulsion, solid content: 52% by mass, the minimum film forming temperature (MFT): 28° C., glass transition temperature (Tg): 18° C. to 23° C.

*Polysol ROY6312: manufactured by Showa Denko K.K., an acryl-silicone resin emulsion, solid content: 40% by mass, the minimum film forming temperature (MFT): 20° C., glass transition temperature (Tg): 8° C.

*HYDRAN HW-930: manufactured by DIC CORPORATION, a polyester-based urethane resin emulsion, solid content: 50% by mass, the minimum film forming temperature (MFT): 0° C. or lower, softening temperature: 115° C. to 120° C.

*VONCOAT9455: manufactured by DIC CORPORATION, a styrene-acryl resin emulsion, solid content: 40% by mass, the minimum film forming temperature (MFT): 38° C. to 46° C., glass transition temperature (Tg): 29° C.

*VONCOAT BC-280: manufactured by DIC CORPORATION, an acryl resin emulsion, solid content: 50% by mass, the minimum film forming temperature (MFT): 0° C. to 3° C., glass transition temperature (Tg): 2° C.

*Vinyblan 2580: manufactured by Nissin Chemical Co., Ltd., an acryl resin emulsion, solid content: 45% by mass, the minimum film forming temperature (MFT): 100° C. or higher, glass transition temperature (Tg): 100° C.

*Vinyblan 2586: manufactured by Nissin Chemical Co., Ltd., a styrene-acryl resin emulsion, solid content: 45% by mass, the minimum film forming temperature (MFT): 0° C. or lower, glass transition temperature (Tg): −33° C.

*Compound of the formula (F-1)-e:

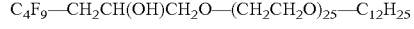

$C_4F_9—CH_2CH(OH)CH_2O—(CH_2CH_2O)_{25}—C_{12}H_{25}$

Examples 1 to 13 and Comparative Examples 1 to 3

Image Forming Step and Fixing Step

An inkjet recording device (IPSiO GXe-5500, manufactured by Ricoh Company Limited) was set in the environment controlled to 23° C.±0.5° C., 50% RH±5% RH in the following manner. Specifically, driving voltage of a piezo element was varied to give the same ejecting amount of an ink to thereby give the same deposition amount of the ink on a recording medium.

Next, an image was formed by setting the printing mode of the inkjet recording device to "glossy paper_high image quality." Moreover, the inkjet recording device was modified to provide a heater roller capable of controlling temperature from the bottom side of the convey belt during printing, and a hot blast heating system capable of controlling temperature adjacent to the sheet-discharge side. By using this device, which could heat-fixing during and just after image formation, a series of processes from the image formation step to a fixing step were performed.

<Post-Treatment Step>

Under the conditions depicted in the column of each of Examples and Comparative Examples in Tables 8 to 10, a post-treatment liquid was applied on the image formation area by a roll coating method, or a jet ejection method using an inkjet head, followed by heating the liquid to dry. In case of the roll coating method, the post-treatment liquid was applied on the entire surface of a recording medium, and a deposition amount of the post-treatment liquid on dry basis after coating and drying was determined. In case of the jet ejection method, moreover, the post-treatment liquid was jet ejected only on the image formation area, and a deposition amount thereof on dry basis was determined from a ratio of the ejected amount to the resin solid content by converging to the dry deposition amount per 1 m². The determined deposition amount was depicted in Table 10. Furthermore, in some of Examples, the post-treatment liquid was smoothly fixed with a heat-fixing roller.

TABLE 8

| | Paper | Manufacturer | Use | Grade | Paper quality Water transfer amount (ml/m²) 100 ms |
|---|---|---|---|---|---|
| Ex. 1 | OK Top Coat+ | Oji Paper | Offset printing | A2 | 3 |
| Ex. 2 | OK Kanafuji+ | Oji Paper | Offset printing | A1 | 1.9 |
| Ex. 3 | SA Kanafuji+ | Oji Paper | Offset printing | A0 | 1.9 |
| Ex. 4 | OK Top Coat+ | Oji Paper | Offset printing | A2 | 3 |
| Ex. 5 | OK Top Coat+ | Oji Paper | Offset printing | A2 | 3 |
| Ex. 6 | OK Top Coat+ | Oji Paper | Offset printing | A2 | 3 |
| Ex. 7 | Aurora Coat | Nippon Paper | Offset printing | A2 | 2.8 |
| Ex. 8 | Super MI Dull | Nippon Paper | Offset printing | A2 | 7 |
| Ex. 9 | Aurora Coat | Nippon Paper | Offset printing | A2 | 2.8 |
| Ex. 10 | Super MI Dull | Nippon Paper | Offset printing | A2 | 7 |
| Ex. 11 | Ricoh Business Coat Gloss 100 | Ricoh | Geljet paper | A2 | 5.8 |
| Ex. 12 | Space DX | Nippon Paper | Gravure printing | — | 9.9 |
| Ex. 13 | Mirror Coat Platinum | Oji Paper | Offset printing | Cast coating paper | 0.2 |
| Comp. Ex. 1 | OK Top Coat+ | Oji Paper | Offset printing | A2 | 3 |
| Comp. Ex. 2 | OK Top Coat+ | Oji Paper | Offset printing | A2 | 3 |
| Comp. Ex. 3 | OK Top Coat+ | Oji Paper | Offset printing | A2 | 3 |

The abbreviations in Table 8 are as follows:
*OK Top Coat+: manufactured by Oji Paper Co., Ltd., offset printing paper, Grade A2
*OK Kanafuji+: manufactured by Oji Paper Co., Ltd., offset printing paper, Grade A1
*SA Kanafuji+: manufactured by Oji Paper Co., Ltd., offset printing paper, Grade A0
*Aurora Coat: manufactured by Nippon Paper Industries Co., Ltd., offset printing paper, Grade A2
*Super MI Dull: manufactured by Nippon Paper Industries Co., Ltd., offset printing paper. Grade A2
*Ricoh Business Coat Gloss 100: manufactured by Ricoh Company Limited, gel jet paper, Grade A2
*Space DX: manufactured by Nippon Paper Industries Co., Ltd., gravure printing paper
*Mirror Coat Platinum: manufactured by Oji Paper Co., Ltd., offset printing paper, cast coating paper

TABLE 9

|  | Image forming step | | Fixing step*1 | |
|---|---|---|---|---|
|  | Inkset | GXe5500 printing mode | Heating during image formation | Heating just after image formation |
| Ex. 1 | Production Ex. 1-4 | glossy paper_high quality | 120° C. heat roll | 100° C. hot blast |
| Ex. 2 | Production Ex. 1-4 | glossy paper_high quality | 120° C. heat roll | 100° C. hot blast |
| Ex. 3 | Production Ex. 5-8 | glossy paper_high quality | 120° C. heat roll | 100° C. hot blast |
| Ex. 4 | Production Ex. 9-12 | glossy paper_high quality | 120° C. heat roll | — |
| Ex. 5 | Production Ex. 9-12 | glossy paper_high quality | — | 100° C. hot blast |
| Ex. 6 | Production Ex. 9-12 | glossy paper_high quality | 120° C. heat roll | 100° C. hot blast |
| Ex. 7 | Production Ex. 9-12 | glossy paper_high quality | 120° C. heat roll | 100° C. hot blast |
| Ex. 8 | Production Ex. 9-12 | glossy paper_high quality | 120° C. heat roll | 100° C. hot blast |
| Ex. 9 | Production Ex. 5-8 | glossy paper_high quality | 120° C. heat roll | 100° C. hot blast |
| Ex. 10 | Production Ex. 9-12 | glossy paper_high quality | 120° C. heat roll | 100° C. hot blast |
| Ex. 11 | Production Ex. 13-16 | glossy paper_high quality | 120° C. heat roll | 100° C. hot blast |
| Ex. 12 | Production Ex. 9-12 | glossy paper_high quality | 120° C. heat roll | 100° C. hot blast |
| Ex. 13 | Production Ex. 9-12 | glossy paper_high quality | 120° C. heat roll | 100° C. hot blast |
| Comp. Ex. 1 | Production Ex. 9-12 | glossy paper_high quality | — | — |
| Comp. Ex. 2 | Production Ex. 17-20 | glossy paper_high quality | 120° C. heat roll | — |
| Comp. Ex. 3 | Production Ex. 21-24 | glossy paper_high quality | 120° C. heat roll | — |

*1An inkjet recording device was modified by providing a heater roller capable of controlling temperature from the bottom side of a convey belt during printing, and providing a hot blast drying system capable of controlling temperature adjacent to the sheet-discharge side, to provide a device capable of performing heat-fixing during and just after image formation.

TABLE 10

| | Post-treatment step | | | | | |
|---|---|---|---|---|---|---|
|  | Post-treatment liquid | Dry deposition amount | Coating method | Coating area | Drying method | Heat-fixing |
| Ex. 1 | — | — | — | — | — | — |
| Ex. 2 | Production Ex. A3 | 1.6 g/m² | Head ejecting | Only image area | Heat roller drying | — |
| Ex. 3 | Production Ex. A3 | 1.6 g/m² | Head ejecting | Only image area | Heat roller drying | Yes |
| Ex. 4 | — | — | — | — | — | — |
| Ex. 5 | — | — | — | — | — | — |
| Ex. 6 | — | — | — | — | — | — |
| Ex. 7 | Production Ex. A1 | 0.8 g/m² | Roll coating | Entire surface | Hot blast drying | — |
| Ex. 8 | Production Ex. A2 | 1.6 g/m² | Head ejecting | Only image area | Hot blast drying | — |
| Ex. 9 | Production Ex. A3 | 1.6 g/m² | Head ejecting | Only image area | Heat roller drying | Yes |

TABLE 10-continued

| | | Post-treatment step | | | |
|---|---|---|---|---|---|
| | Post-treatment liquid | Dry deposition amount | Coating method | Coating area | Drying method | Heat-fixing |
| Ex. 10 | Production Ex. A4 | 1.6 g/m² | Roll coating | Entire surface | Hot blast drying | — |
| Ex. 11 | Production Ex. A5 | 1.6 g/m² | Roll coating | Entire surface | Natural drying | Yes |
| Ex. 12 | Production Ex. A6 | 1.6 g/m² | Roll coating | Entire surface | IR drying | — |
| Ex. 13 | Production Ex. A1 | 1.6 g/m² | Roll coating | Entire surface | Hot blast drying | — |
| Comp. Ex. 1 | Production Ex. A3 | 1.6 g/m² | Head ejecting | Only image area | Heat roller drying | — |
| Comp. Ex. 2 | Production Ex. A3 | 1.6 g/m² | Head ejecting | Only image area | Heat roller drying | — |
| Comp. Ex. 3 | Production Ex. A3 | 1.6 g/m² | Head ejecting | Only image area | Heat roller drying | — |

Next, Examples 1 to 13 and Comparative Examples 1 to 3 were each subjected to evaluations of an image density, beading, color breeding, smear fixing, and glossiness (image gloss) in the following manners. The results are presented in Table 11.

Note that, a judgment of the evaluation was performed on each color based on the evaluation criteria. Then, the most common judgment result was described as the result of each image quality item for the evaluation. In the case where the same numbers of the judgment results were attained in each evaluation item, the better result was described as the judgment result.

<Image Density>

A monocolor (each of black, yellow, magenta, and cyan) chart including a 64-point symbol "black square" produced using Microsoft Word 2000 (of Microsoft) was printed on each recording medium. Moreover, a post-treatment step was performed in some of Examples.

The color in the "black square" portions on a printed surface was measured by X-Rite939 (manufactured by X-Rite), and the result was evaluated based on the following evaluation criteria. As for the printing mode, "glossy paper_high image quality" mode was changed to the "no color correction" mode by using a driver that accompanied the inkjet recording device. Note that, the "black square" is a symbol that is a square filled in black, but it is unavoidably described as "black square" as the symbol itself cannot be used here.

[Evaluation Criteria 1]-[Glossy paper-high image quality mode]
 A: (Black) 2.0 or greater,
 (Yellow) 1.25 or greater,
 (Magenta) 2.0 or greater, or
 (Cyan) 2.0 or greater
 B: (Black) 1.9 or greater but less than 2.0,
 (Yellow) 1.2 or greater but less than 1.25,
 (Magenta) 1.9 or greater but less than 2.0, or
 (Cyan) 1.9 or greater but less than 2.0
 C: (Black) 1.8 or greater but less than 1.9,
 (Yellow) 1.15 or greater but less than 1.2,
 (Magenta) 1.8 or greater but less than 1.9, or
 (Cyan) 1.8 or greater but less than 1.9
 D: (Black) less than 1.8,
 (Yellow) less than 1.15,
 (Magenta) less than 1.8, or
 (Cyan) less than 1.8

<Beading>

A cyan, magenta, or green solid image was printed on each recording medium in the same manner as in the evaluation of the image density. The density unevenness (bleeding) of the solid image was observed, and judged based on the following evaluation criteria.
[Evaluation Criteria]
 A: No density unevenness at all
 B: Slight density unevenness
 C: Noticeable density unevenness
 D: Significant density unevenness <Color Bleeding>

Black, yellow, magenta, and cyan monocolor solid charts were printed out next to each other on each recording medium in the same manner as in the evaluation of the image density. Moreover, a black character "A" was printed at the center of each of the yellow, magenta, and cyan monocolor solid charts, and color bleeding as occurred was observed, and evaluated based on the following evaluation criteria.
[Evaluation Criteria]
 A: No color bleeding occurred at all
 B: Slight color bleeding occurred
 C: Noticeable color bleeding occurred
 D: Significant color bleeding occurred <Fixing Ability without Smearing>

A chart was printed out on each recording medium in the same manner as in the evaluation of the image density.

Subsequently, the printed recording medium was dried for 24 hours in the environment having the temperature of 23° C.±2° C., and the humidity of 50% RH±15% RH, and the JIS L0803 cotton No. 3 attached to a CM-1 clock meter (clock meter C-1 (manually operated), manufactured by Daiei Kagaku Seiki Mfg, Co., Ltd.) with a double-sided tape was rubbed with 5 retunes on the "black square" part of the printed surface in the manner that the cotton was placed against the printed area. The ink stain on the cotton was measured by means of X-Rite939 (manufactured by X-Rite), and the density of the stained area from which the background color of the cotton cloth was subtracted was judged based on the following evaluation criteria.
[Evaluation Criteria]
 A: less than 0.05
 B: 0.05 or greater, but less than 0.1
 C: 0.1 or greater, but less than 0.15 (practically usable level)
 D: 0.15 or greater <Glossiness>

A chart was printed out on each recording medium in the same manner as in the evaluation of the image density, followed by performing a post-treatment step.

The 60-degrees glossiness was measured on the "black square" area of the printed surface by means of a gloss meter (4501, manufactured by BYK Gardener), and the result was judged based on the following evaluation criteria. As for the printing mode, a mode where the "glossy paper_high image quality" mode was modified to the "no color correction" mode by using a driver that accompanied the inkjet recording device was used.
[Evaluation Criteria]
 A: 50° or greater
 B: 30° or greater but less than 50°
 C: 15° or greater but less than 30°
 D: 15° or less

TABLE 11

| | Image evaluation | | | | |
|---|---|---|---|---|---|
| | Image density | Beading | Color bleeding | Fixing ability without smearing | Glossiness |
| Ex. 1 | B | B | B | C | C |
| Ex. 2 | A | B | B | A | B |
| Ex. 3 | A | A | A | A | A |
| Ex. 4 | B | B | B | B | C |
| Ex. 5 | B | B | B | B | C |
| Ex. 6 | B | A | A | B | C |
| Ex. 7 | A | A | A | A | B |
| Ex. 8 | A | A | A | A | B |
| Ex. 9 | A | A | A | A | A |
| Ex. 10 | A | A | A | A | B |
| Ex. 11 | A | A | A | A | A |
| Ex. 12 | A | A | A | A | B |
| Ex. 13 | A | B | B | A | A |
| Comp. Ex. 1 | A | D | D | A | B |
| Comp. Ex. 2 | A | D | D | A | B |
| Comp. Ex. 3 | A | D | D | A | B |

The embodiments of the present invention are, for example, as follows:

<1> An image forming method, including:
ejecting an inkjet ink containing a colorant, a water-soluble organic solvent, a surfactant, and water onto a surface of a recording medium at a side where a coating layer is provided, to thereby form an image, in which the recording medium contains a support, and the coating layer provided at least one surface of the support; and
heating the image to a temperature of 100° C. to 150° C. during, or after, or both during and after formation of the image in the ejecting, to thereby heat-fix the image onto the recording medium,
wherein the water-soluble organic solvent contains at least a compound represented by the following structural formula (I):

<Structural Formula (I)>

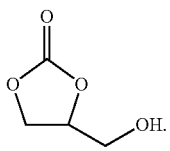

<2> The image forming method according to <1>, wherein the colorant is an anionic self-dispersible pigment, or an anionic resin-coated pigment, or both thereof.
<3> The image forming method according to <1> or <2>, wherein the inkjet ink further contains an anionic water-dispersible resin.
<4> The image forming method according to <3>, wherein the anionic water-dispersible resin is a styrene-acryl resin, a urethane resin, an acryl-silicone resin, or any combination thereof.
<5> The image forming method according to any one of <1> to <4>, further containing applying a post-treatment liquid containing at least a water-dispersible resin, and water onto the recording medium, on which the image has been formed.
<6> The image forming method according to <5>, wherein the water-dispersible resin is an acryl resin, a styrene-acryl resin, a urethane resin, an acryl-silicone resin, a fluororesin, or any combination thereof.
<7> The image forming method according to <5> or <6>, wherein a deposition amount of the post-treatment liquid is 0.5 g/m² to 10 g/m² on dry basis.
<8> The image forming method according to any of <5> to <7>, further containing heating the recording medium, on which the post-treatment liquid has been applied, to the range of 100° C. to 150° C., to thereby heat-fix the post-treatment liquid onto the recording medium.
<9> An image forming apparatus, containing:
an image forming unit configured to eject an inkjet ink containing a colorant, a water-soluble organic solvent, a surfactant, and water onto a surface of a recording medium at a side where a coating layer is provided, to thereby form an image, in which the recording medium contains a support, and the coating layer provided at least one surface of the support; and
a fixing unit configured to heat the image to a temperature of 100° C. to 150° C. during, or after, or both during and after formation of the image in the ejecting, to thereby heat-fix the image onto the recording medium,
wherein the water-soluble organic solvent contains at least a compound represented by the following structural formula (I):

<Structural Formula (I)>

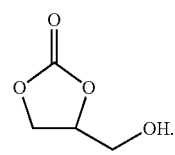

<10> The image forming apparatus according to <9>, further including a post-treatment unit configured to apply a post-treatment liquid containing at least a water-dispersible resin, and water onto the recording medium, on which the image has been formed.

This application claims priority to Japanese application No. 2013-212492, filed on Oct. 10, 2013 and incorporated herein by reference.

What is claimed is:
1. An image forming method, comprising:
ejecting an inkjet ink containing a colorant, a water-soluble organic solvent, a surfactant, and water onto a surface of a recording medium at a side where a coating layer is provided, to thereby form an image, in which the recording medium contains a support, and the coating layer provided at least one surface of the support; and
heating the image to a temperature of 100° C. to 150° C. during, or after, or both during and after formation of the image in the ejecting, to thereby heat-fix the image onto the recording medium,
wherein the water-soluble organic solvent contains at least a compound of formula (I):

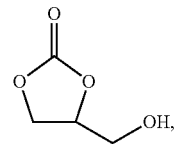

and
wherein an amount of the compound of formula (I) is from 12.5% to 40% by mass, relative to a total amount of the inkjet ink.

2. The image forming method according to claim 1, wherein the colorant is an anionic self-dispersible pigment, or an anionic resin-coated pigment, or both thereof.

3. The image forming method according to claim 1, wherein the inkjet ink further contains an anionic water-dispersible resin.

4. The image forming method according to claim 3, wherein the anionic water-dispersible resin is a styrene-acryl resin, a urethane resin, an acryl-silicone resin, or any combination thereof.

5. The image forming method according to claim 1, further comprising applying a post-treatment liquid containing at least a water-dispersible resin, and water onto the recording medium, on which the image has been formed.

6. The image forming method according to claim 5, wherein the water-dispersible resin is an acryl resin, a styrene-acryl resin, a urethane resin, an acryl-silicone resin, a fluororesin, or any combination thereof.

7. The image forming method according to claim 5, wherein a deposition amount of the post-treatment liquid is 0.5 g/m² to 10 g/m² on dry basis.

8. The image forming method according to claim 5, further comprising heating the recording medium, on which the post-treatment liquid has been applied, to the range of 100° C. to 150° C., to thereby heat-fix the post-treatment liquid onto the recording medium.

9. An image forming apparatus, comprising:
an image forming unit configured to eject an inkjet ink containing a colorant, a water-soluble organic solvent, a surfactant, and water onto a surface of a recording medium at a side where a coating layer is provided, to thereby form an image, in which the recording medium contains a support, and the coating layer provided at least one surface of the support; and
a fixing unit configured to heat the image to a temperature of 100° C. to 150° C. during, or after, or both during and after formation of the image in the ejecting, to thereby heat-fix the image onto the recording medium,
wherein the water-soluble organic solvent contains at least a compound of structural formula (1):

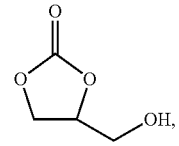

wherein an amount of the compound of formula (I) is from 12.5% to 40% by mass, relative to a total amount of the inkjet ink.

10. The image forming apparatus according to claim 9, further comprising a post-treatment unit configured to apply a post-treatment liquid containing at least a water-dispersible resin, and water onto the recording medium, on which the image has been formed.

* * * * *